United States Patent
Mauffette et al.

(10) Patent No.: US 9,364,076 B2
(45) Date of Patent: Jun. 14, 2016

(54) TOOTHBRUSH HOLDER APPARATUS

(71) Applicant: MAXOR INC., Drummondville (CA)

(72) Inventors: Claude Mauffette, Montreal (CA);
Jean-François Jacques, Montreal (CA);
Denis Lamothe, Drummondville (CA);
Jean Lamothe, Drummondville (CA);
Pierre Halmai, Montreal (CA)

(73) Assignee: MAXOR INC., Drummondville (CA)

( * ) Notice: Subject to any disclaimer, the term of this patent is extended or adjusted under 35 U.S.C. 154(b) by 0 days.

(21) Appl. No.: 14/710,957

(22) Filed: May 13, 2015

(65) Prior Publication Data
US 2015/0320264 A1  Nov. 12, 2015

Related U.S. Application Data

(63) Continuation-in-part of application No. PCT/CA2013/050733, filed on Sep. 26, 2013.

(60) Provisional application No. 61/729,115, filed on Nov. 21, 2012.

(51) Int. Cl.
*A47B 81/02* (2006.01)
*A46B 17/02* (2006.01)
(Continued)

(52) U.S. Cl.
CPC .................. *A46B 17/02* (2013.01); *A46B 17/04* (2013.01); *A47G 29/08* (2013.01); *A47K 1/09* (2013.01);
(Continued)

(58) Field of Classification Search
CPC ............. A47K 1/09; A47B 81/02; B25H 3/04
USPC ........... 248/108, 110, 111, 113; 211/66, 70.6, 211/65; 206/362.1, 362.2, 362.3; 312/207
See application file for complete search history.

(56) References Cited

U.S. PATENT DOCUMENTS

| 1,117,491 | A | * | 11/1914 | Hornung | ................ | A47G 25/12 |
|   |   |   |   |   |   | 211/63 |
| 1,174,185 | A | * | 3/1916 | Scott | ...................... | A63D 15/10 |
|   |   |   |   |   |   | 211/68 |

(Continued)

FOREIGN PATENT DOCUMENTS

| EP | 0408828 A1 | 1/1991 |
| GB | 1601092 | 10/1981 |
| WO | WO 98/35585 A1 | 8/1998 |

OTHER PUBLICATIONS

CA 2887992 office action dated Sep. 22, 2015.
(Continued)

*Primary Examiner* — Syed A Islam
*Assistant Examiner* — Taylor Morris
(74) *Attorney, Agent, or Firm* — Goudreau Gage Dubuc; Gonzalo Lavin

(57) ABSTRACT

A toothbrush holder enclosure is provided which includes a three parts: a back plate, a resilient clamp and a front cover. The back plate and front cover form a housing. The clamp part has an inverted "U" shape and is made of a resilient material giving it a springy property. The clamp is shaped to urge two clamp arms towards one another in order for the clamp to grip a toothbrush. Two rollers at the tips of the clamp arms engage a toothbrush head inserted in the clamp as the clamp is spread apart from the clamped position to a deviated state. With the toothbrush inserted, the rollers exert pressure on a neck of the toothbrush to hold the toothbrush fast in place. The rolling engagement action of the rollers permits gripping toothbrushes having heads fitted with rubber sides.

15 Claims, 21 Drawing Sheets

(51) Int. Cl.
*A47G 29/08* (2006.01)
*A46B 17/04* (2006.01)
*F16B 2/22* (2006.01)
*F16M 13/02* (2006.01)
*A47K 1/09* (2006.01)
*B65D 35/56* (2006.01)
*B65D 83/10* (2006.01)
*A46B 17/00* (2006.01)
*A47L 13/512* (2006.01)

(52) U.S. Cl.
CPC .................. *F16B 2/22* (2013.01); *F16M 13/02* (2013.01); *A46B 2200/1066* (2013.01); *A47B 81/02* (2013.01); *A47L 13/512* (2013.01)

(56) References Cited

U.S. PATENT DOCUMENTS

| | | | |
|---|---|---|---|
| 1,544,694 A * | 7/1925 | Speidel | A47K 1/09 206/362.1 |
| 1,911,781 A * | 5/1933 | Wolfe, Jr. | A47L 13/512 248/113 |
| 2,162,283 A * | 6/1939 | Oshman | A47K 1/09 206/362.3 |
| 2,275,549 A | 3/1942 | Oshman et al. | |
| 2,309,116 A | 1/1943 | Hylen | |
| 2,531,066 A | 11/1950 | Lynch | |
| 2,600,345 A | 6/1952 | Venditti | |
| 2,937,910 A | 5/1960 | Randa | |
| 3,138,414 A | 6/1964 | La Pollo | |
| 3,977,743 A | 8/1976 | Harris | |
| 4,396,238 A | 8/1983 | Torruella | |
| 4,884,311 A * | 12/1989 | Gergory | A46B 9/04 134/6 |
| 5,332,107 A | 7/1994 | Williams | |
| 7,185,796 B2 * | 3/2007 | Parsons | A45F 5/02 224/197 |
| 2003/0089673 A1 | 5/2003 | Herren | |
| 2006/0032828 A1 | 2/2006 | Chiu | |

OTHER PUBLICATIONS

CA 2887992 office action dated May 26, 2015 with related claims.
EP 13856600 search report dated Oct. 9, 2015 with related claims.
PCT/CA2013/050733 international preliminary report with related claims.
PCT/CA2013/050733 international search report.
PCT/CA2013/050733 written opinion.

* cited by examiner

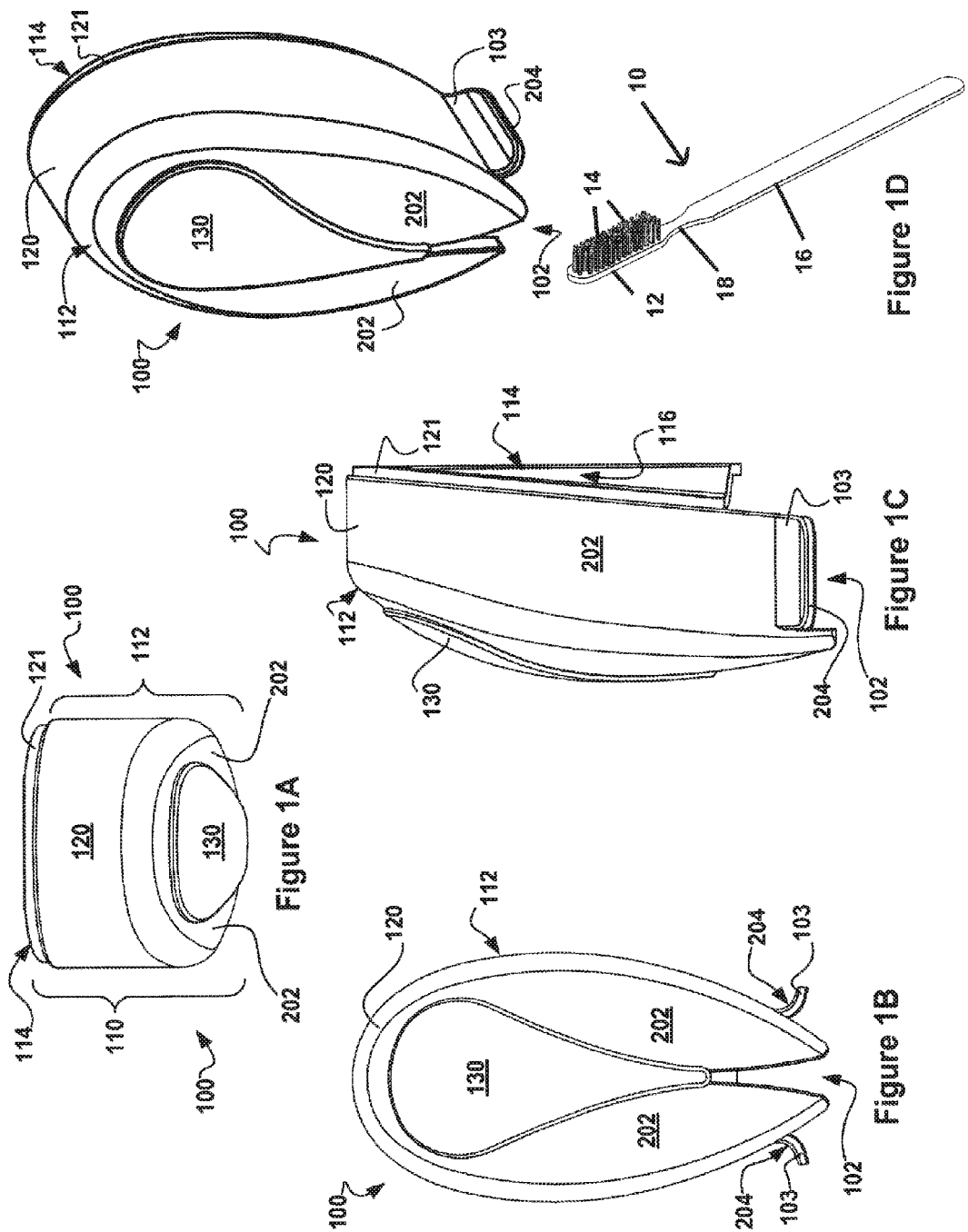

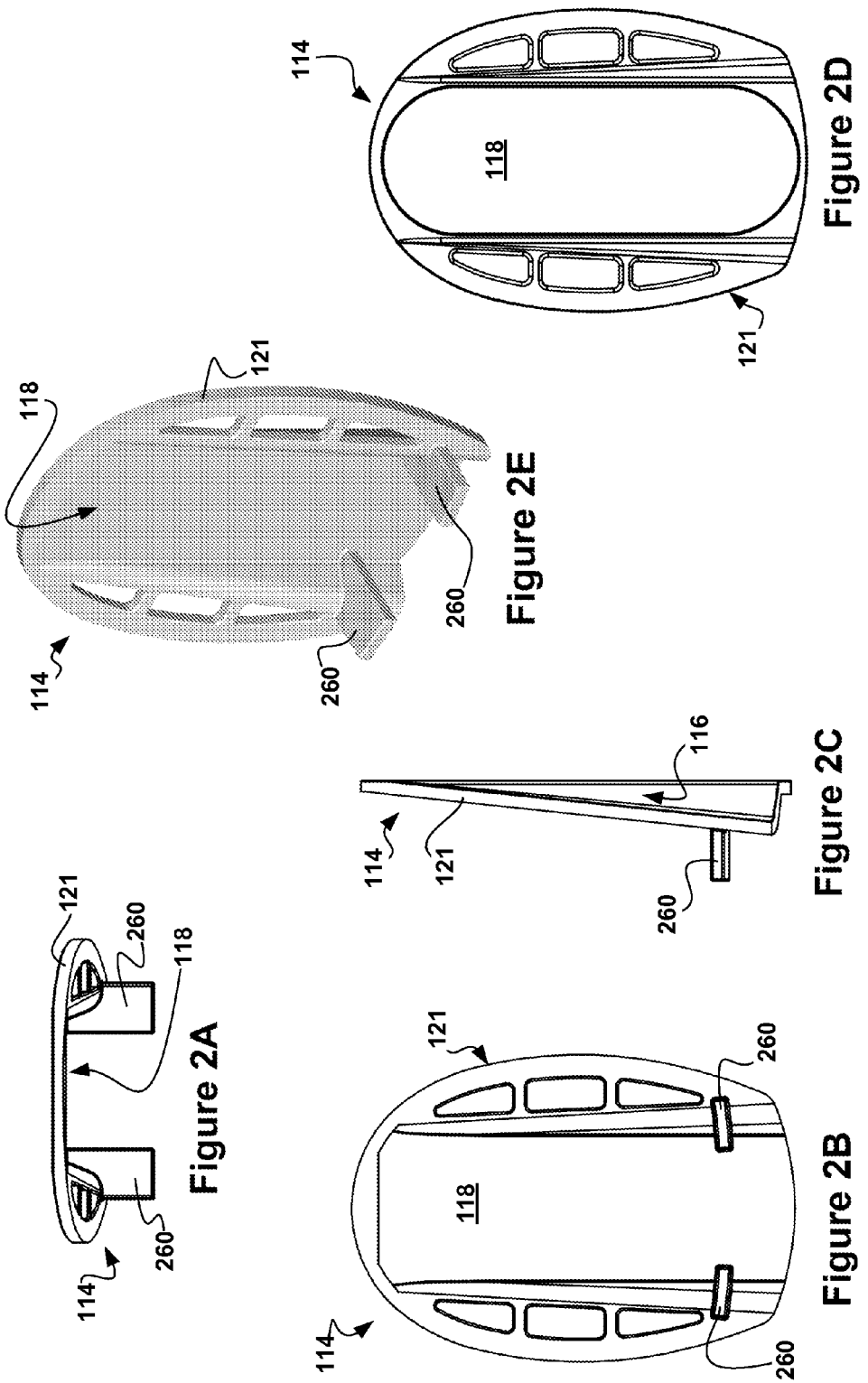

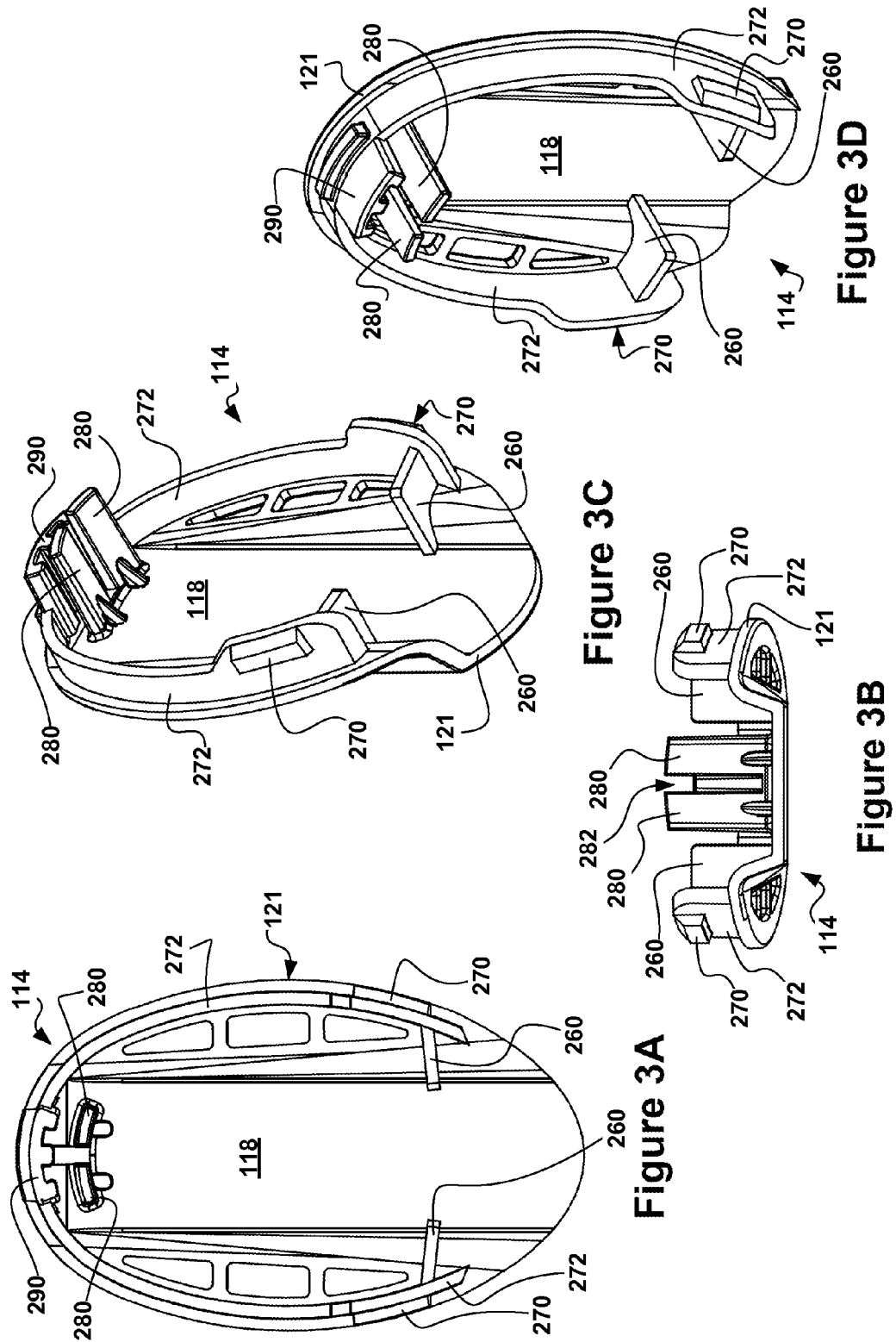

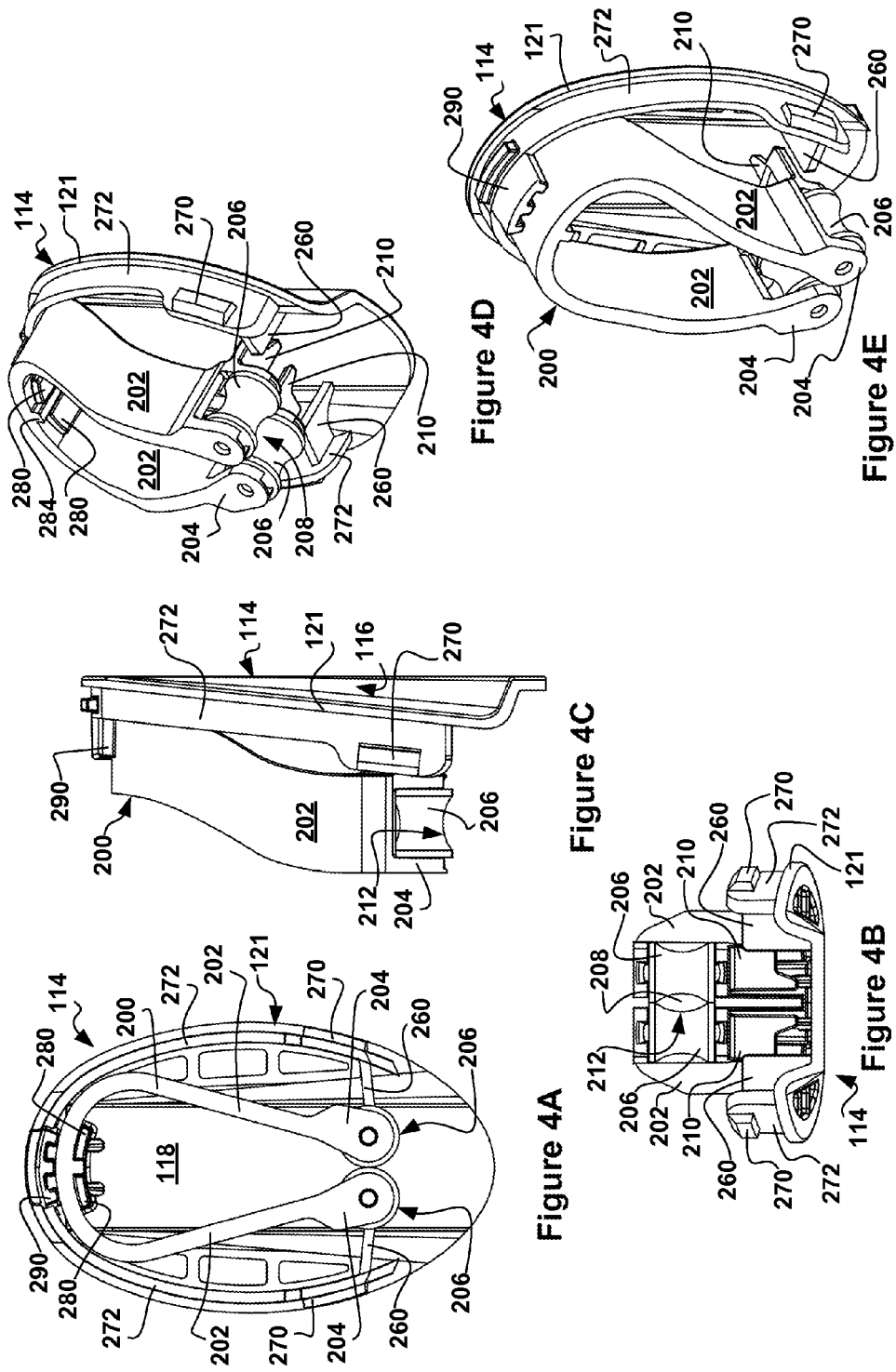

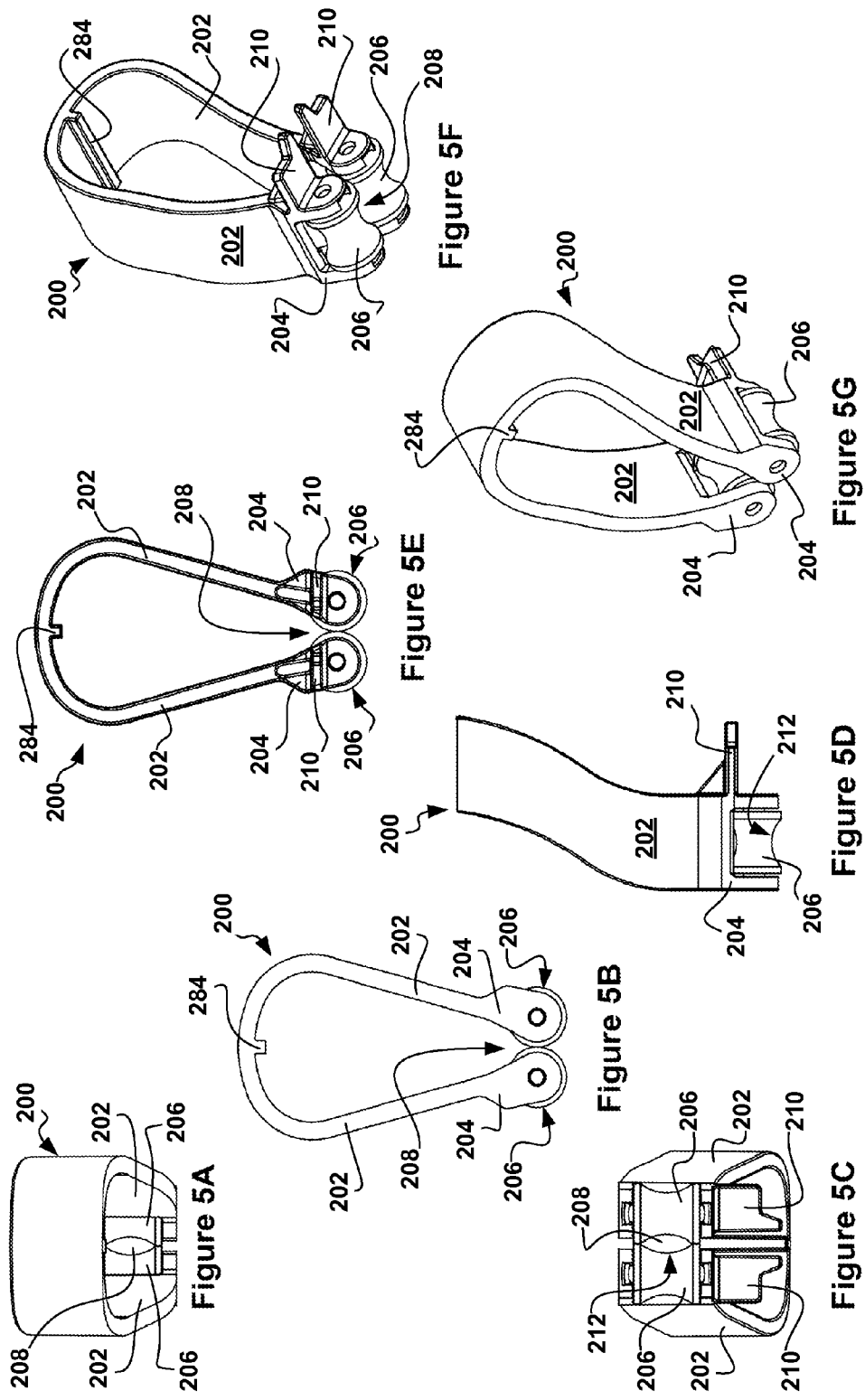

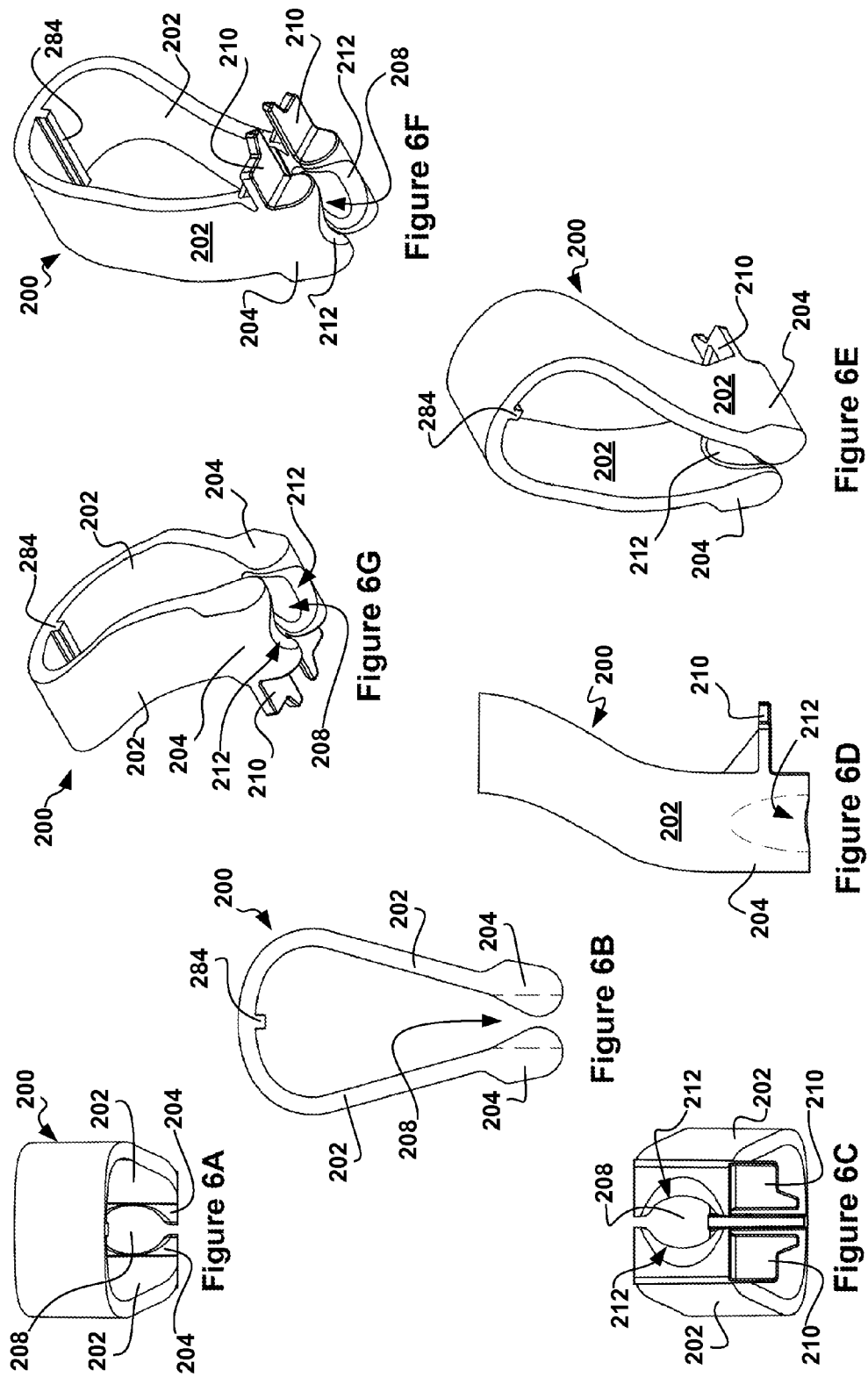

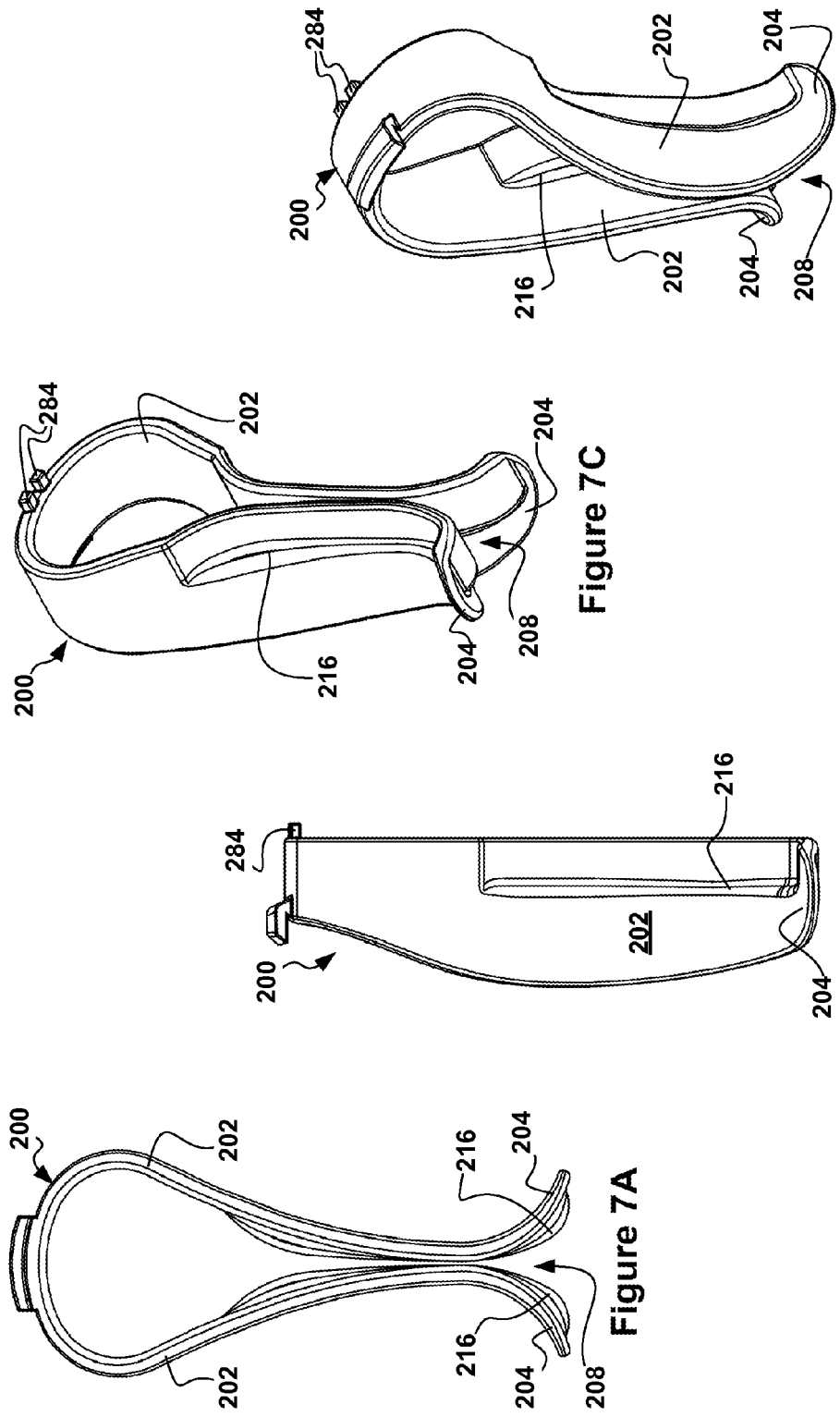

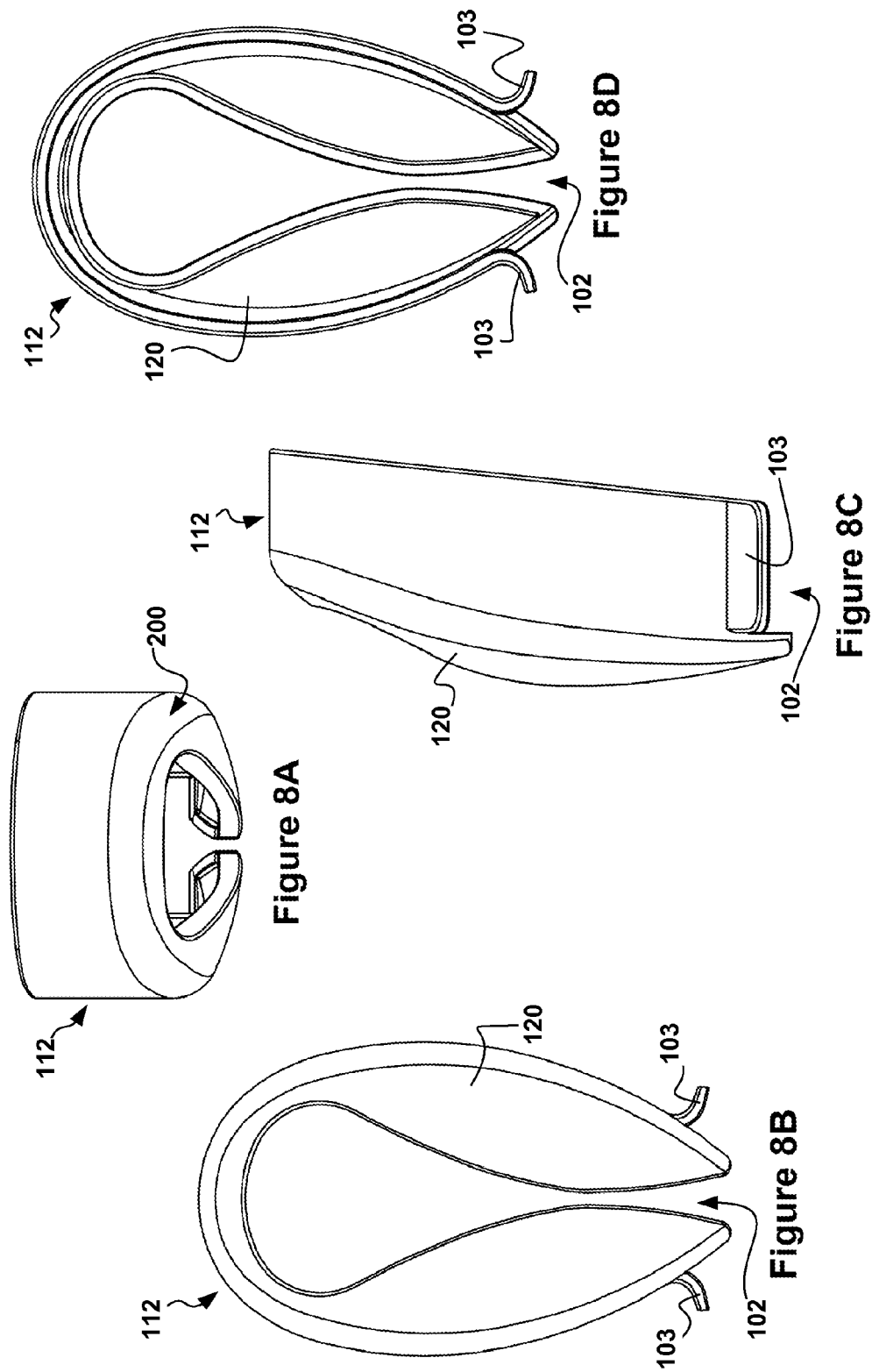

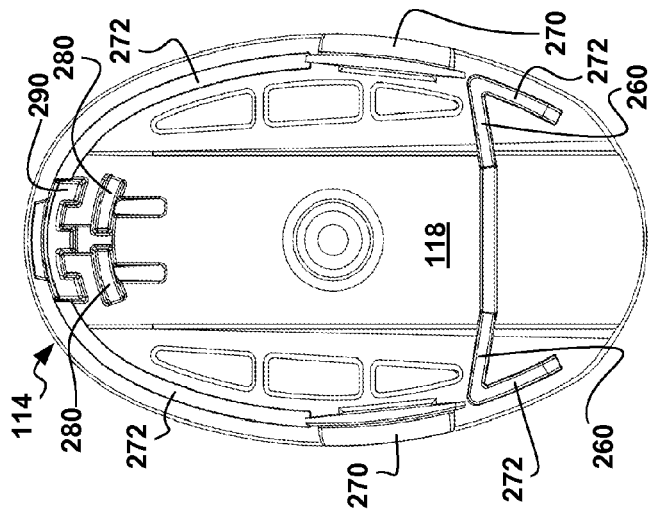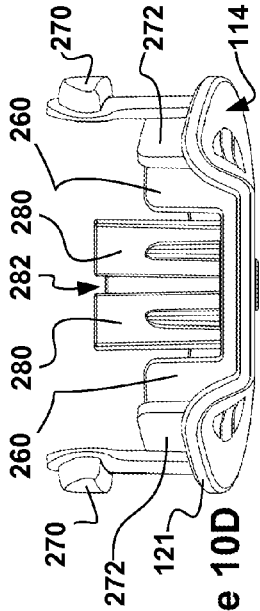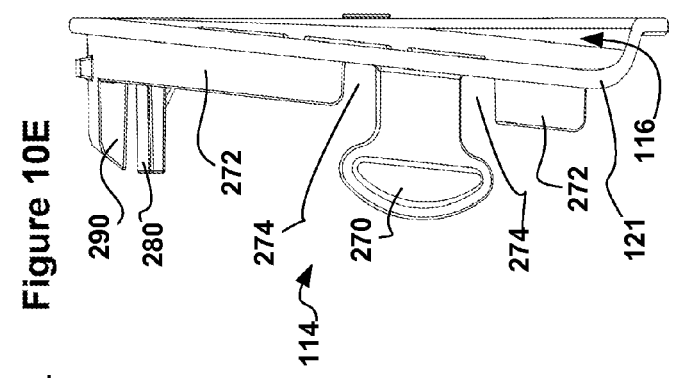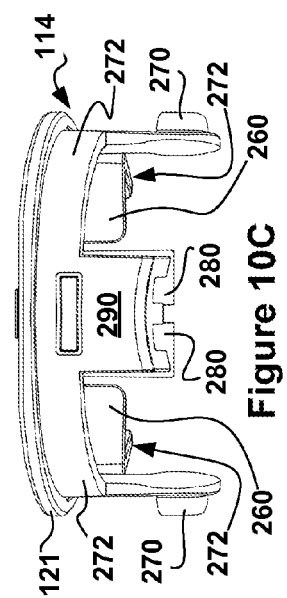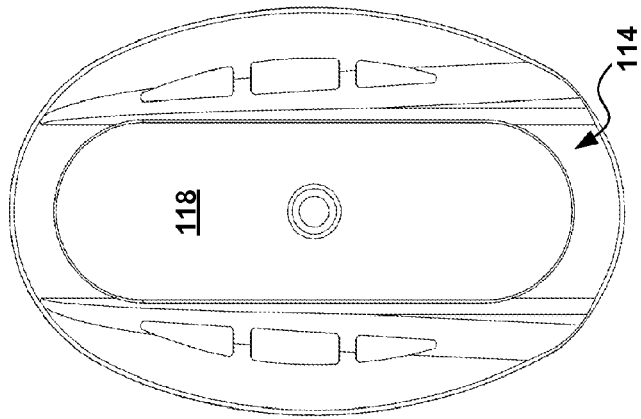

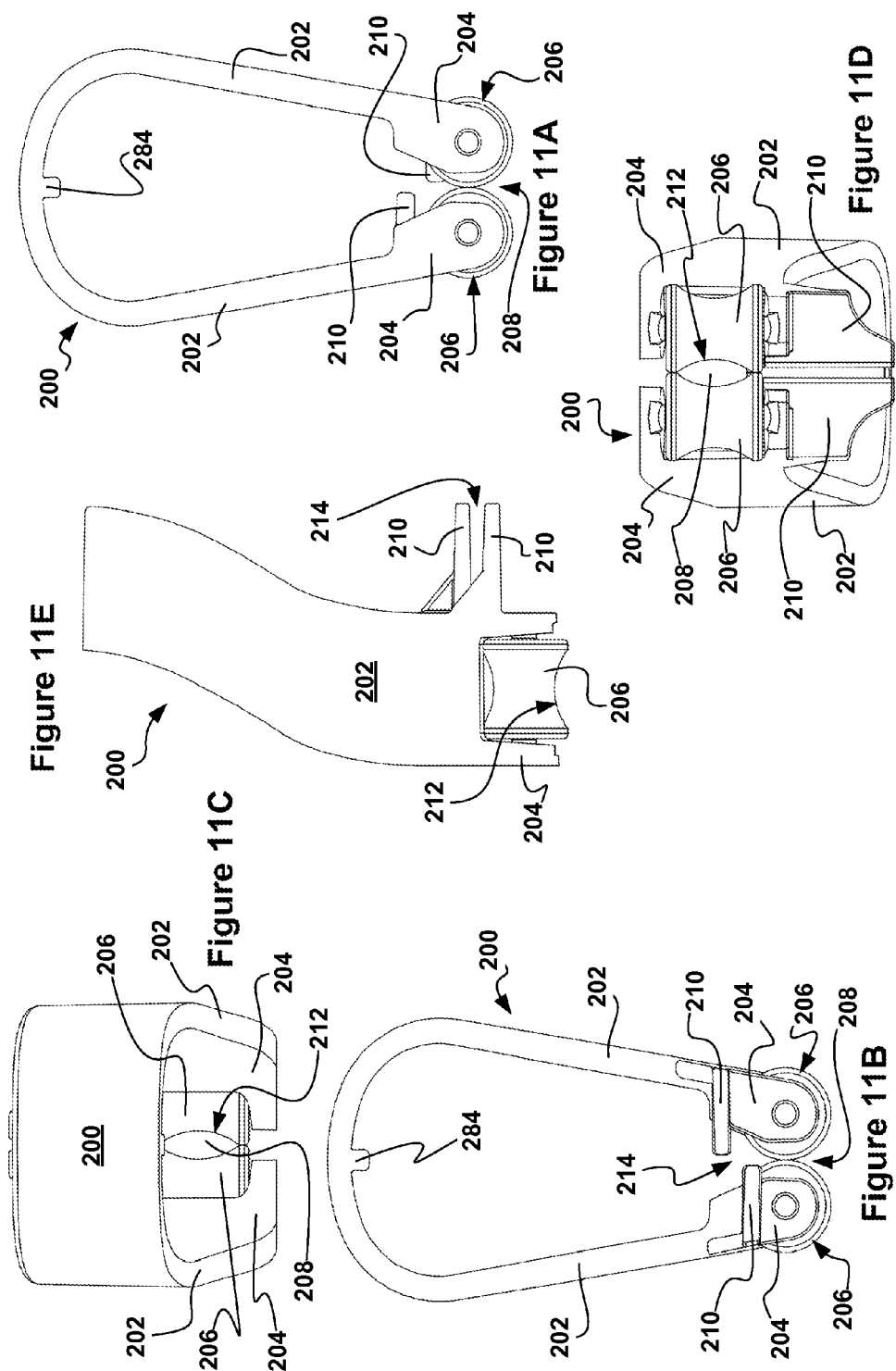

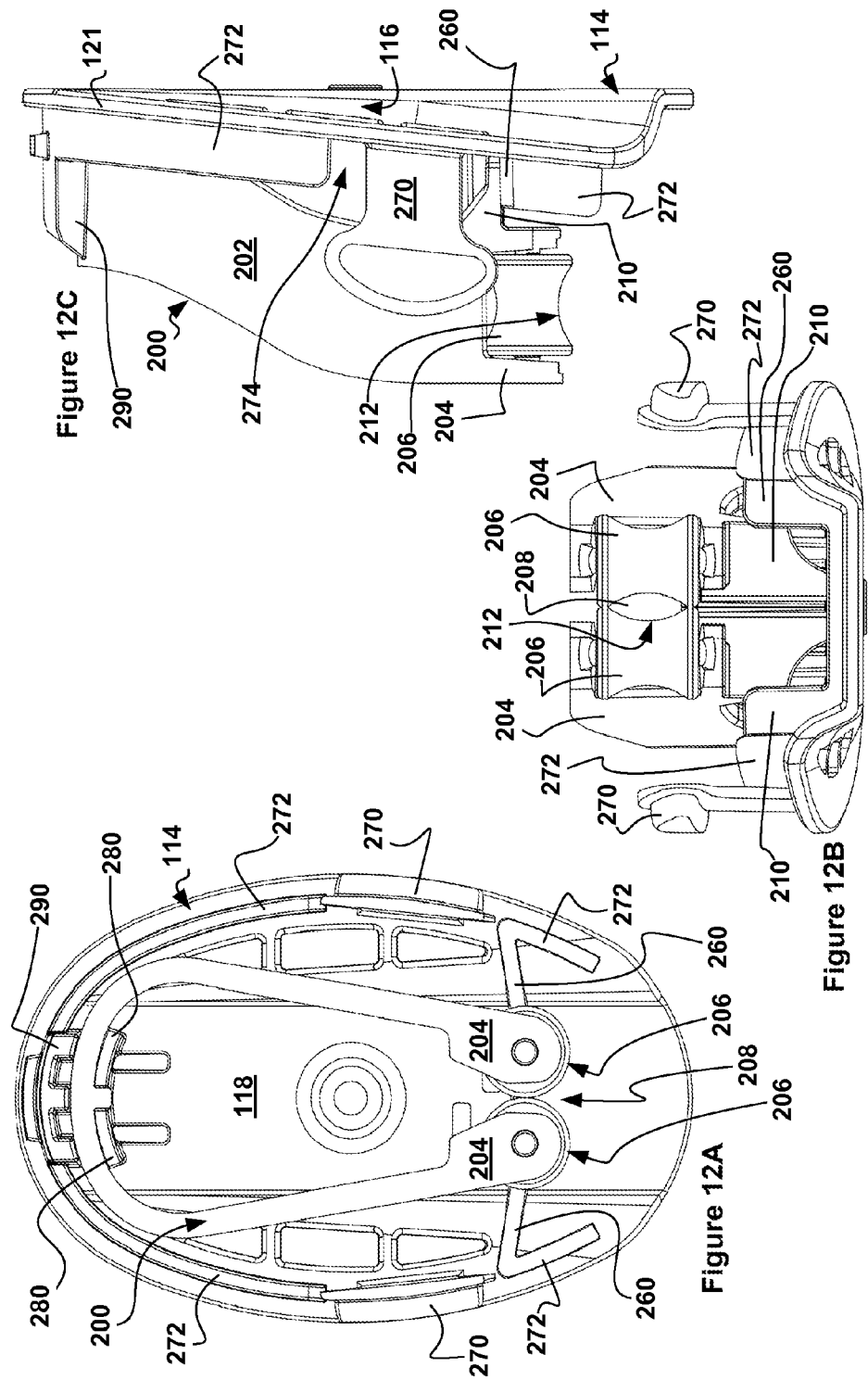

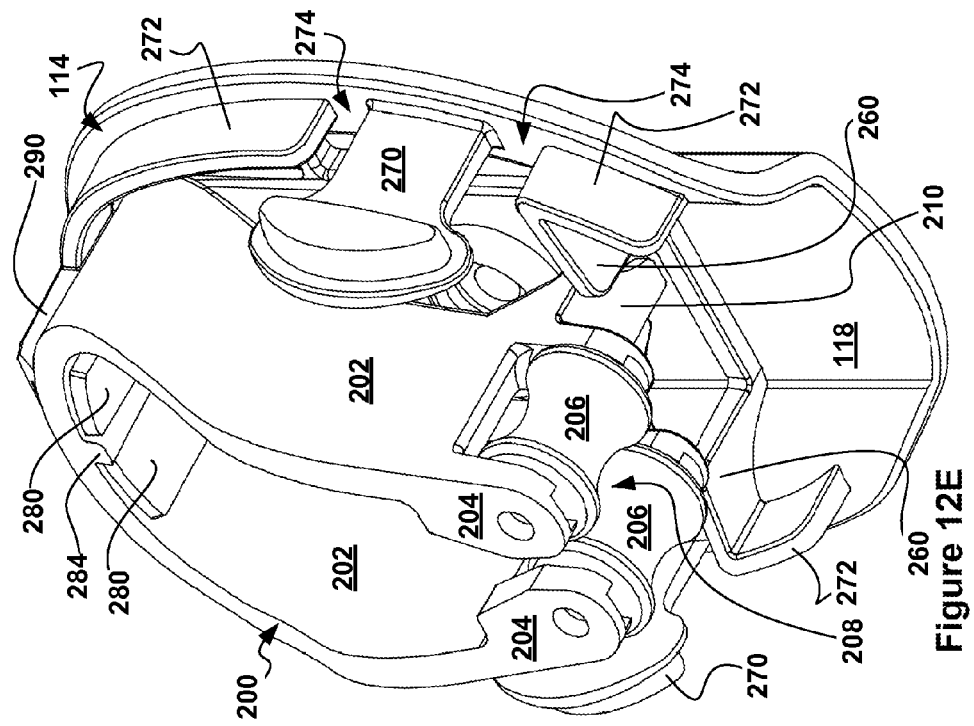
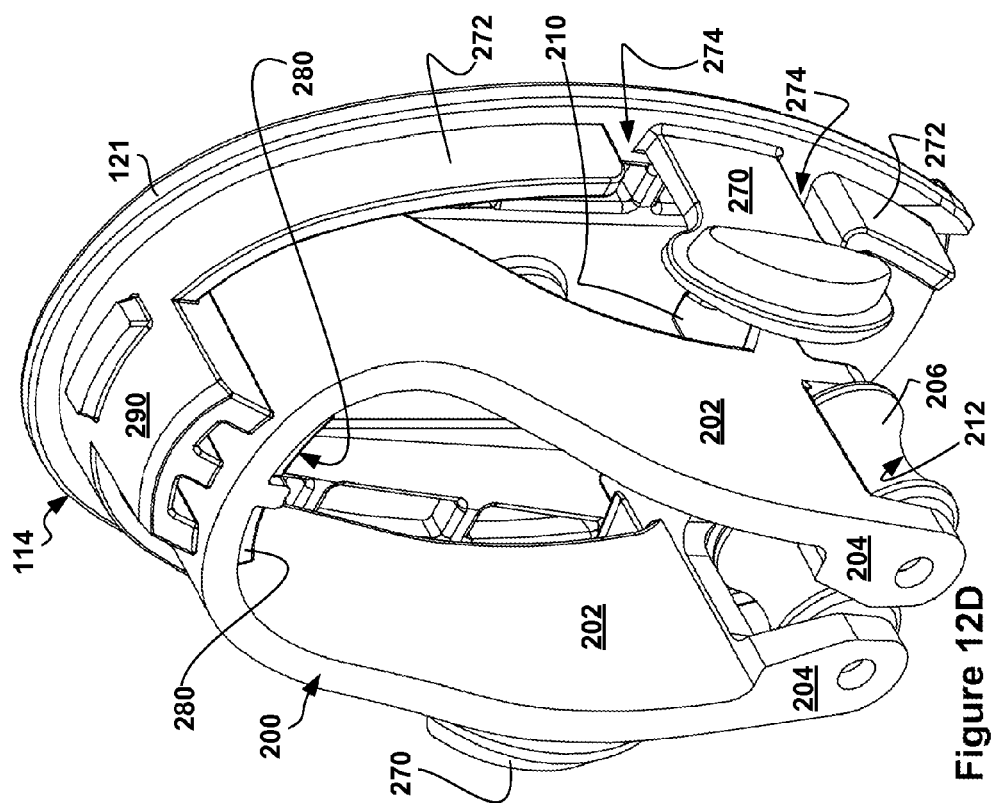

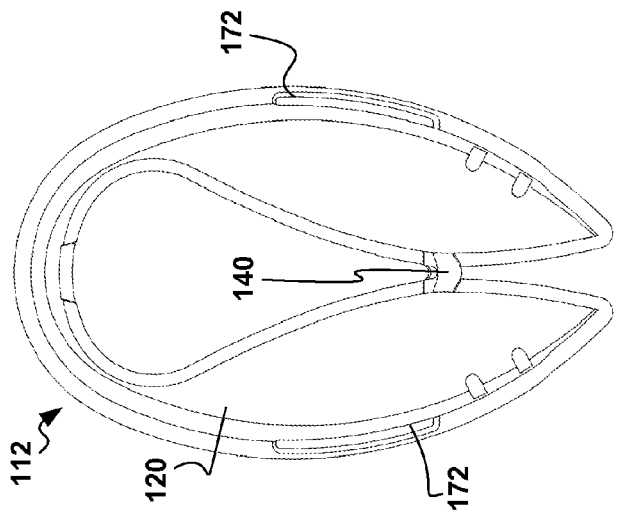
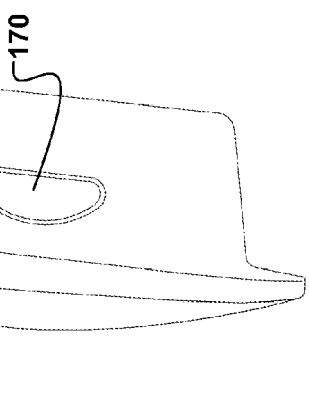
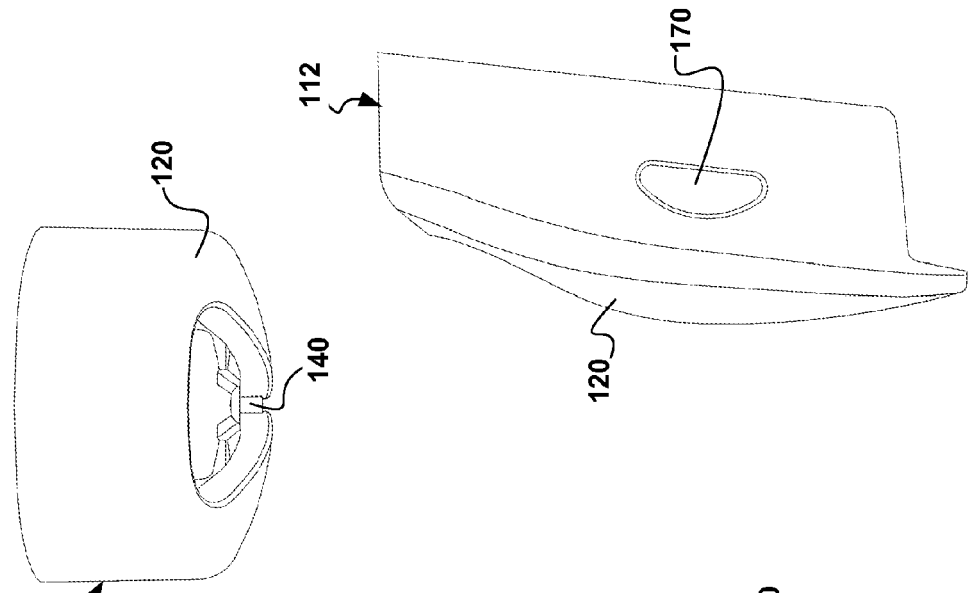
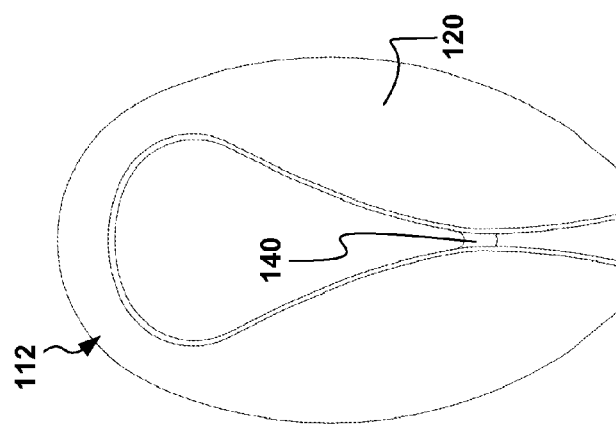

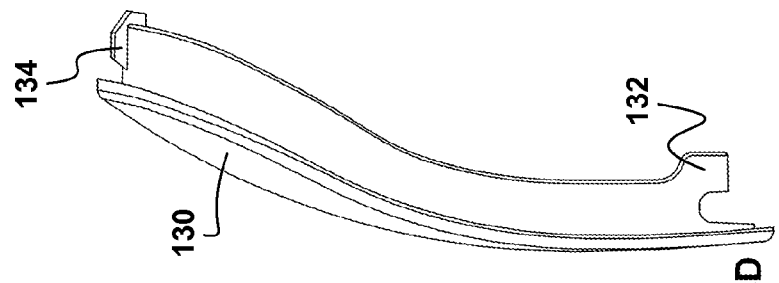
Figure 14D
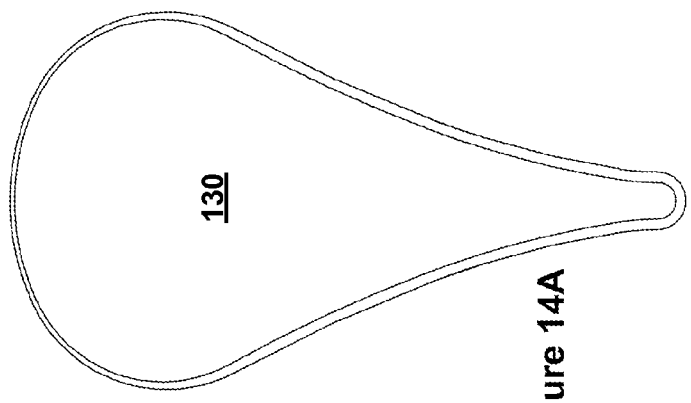
Figure 14C
Figure 14A
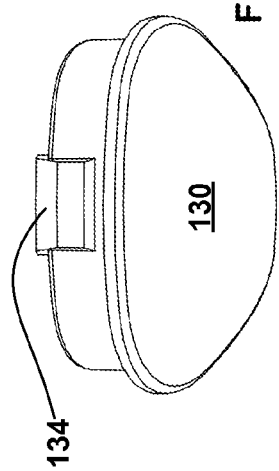
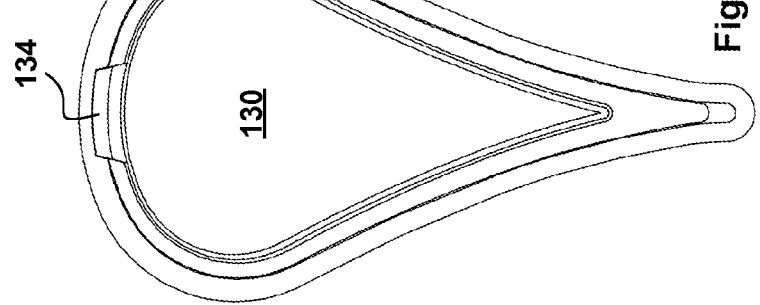
Figure 14B

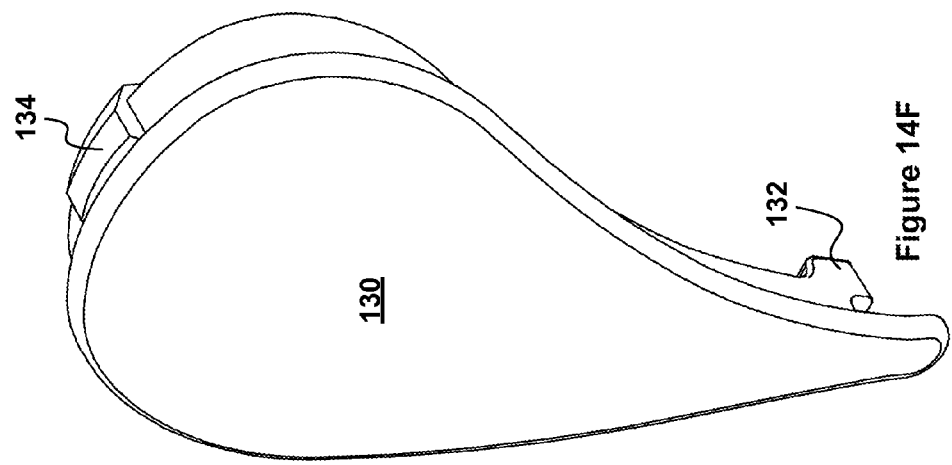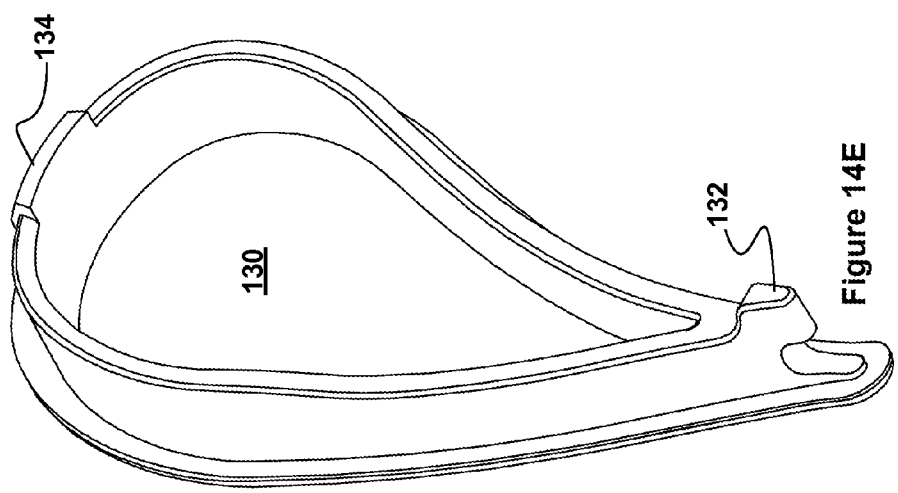

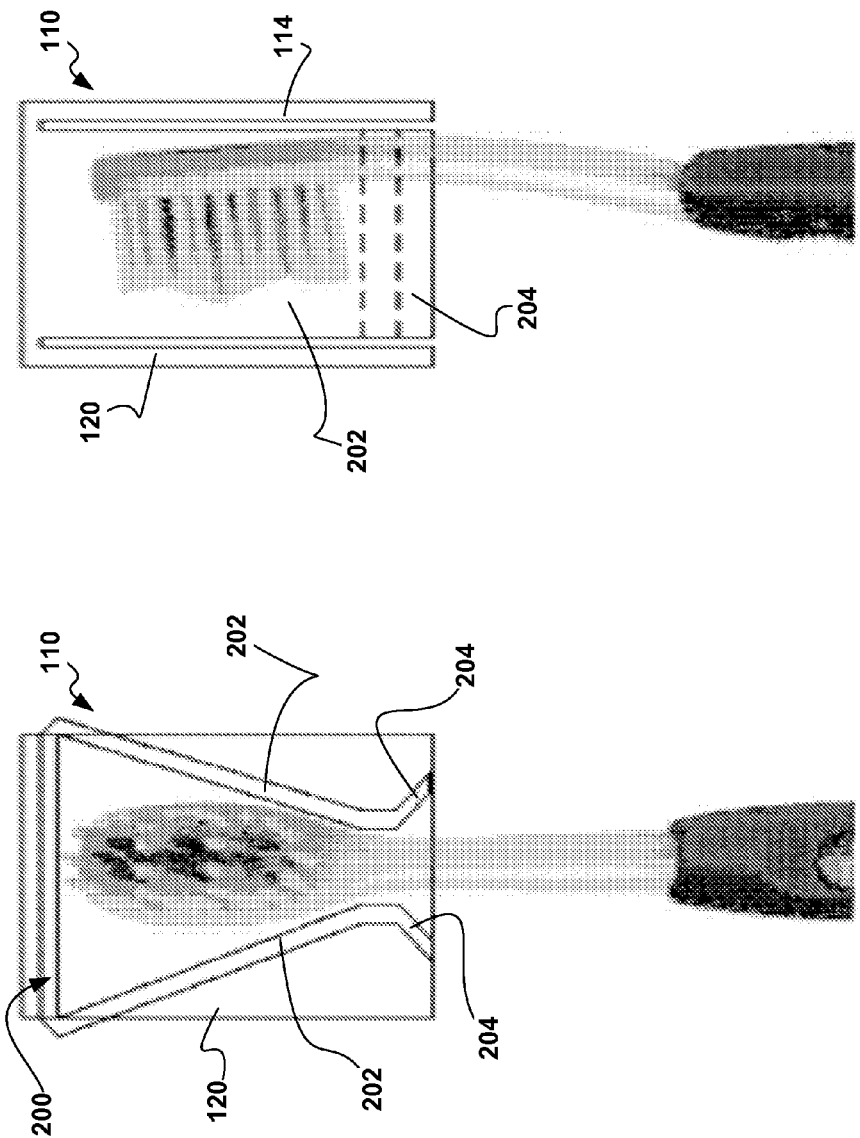

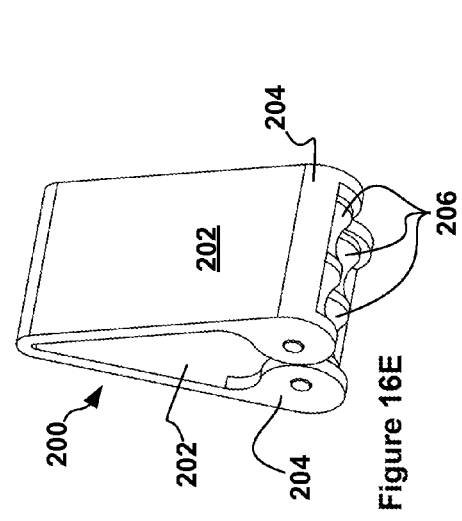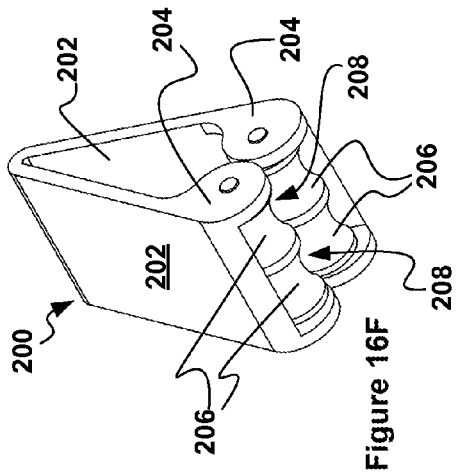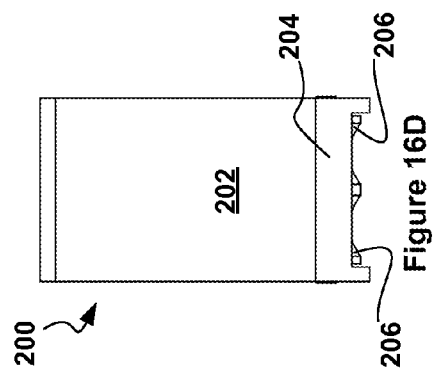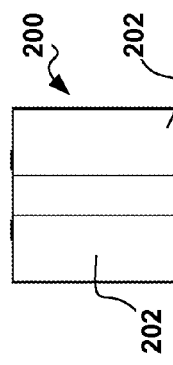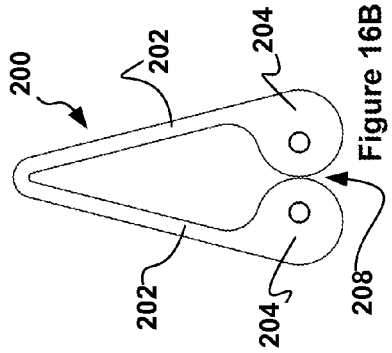

TOOTHBRUSH HOLDER APPARATUS

The present application is a continuation in part of PCT/CA2013/050733 filed on Sep. 26, 2013, which claims priority of US application US 61/729,115 filed on Nov. 21, 2012, the entireties of which are incorporated herein by reference.

TECHNICAL FIELD

This invention relates to toothbrush enclosures, and in particular to a tidy toothbrush holder apparatus for sanitary storage of a toothbrush.

BACKGROUND

There is a growing need for providing a tidy sanitary toothbrush enclosure. One type of toothbrush enclosure provides tidiness by affixing a toothbrush enclosure to a wall. In this regard, a number of attempts have been made for storing conventional toothbrushes.

WO 1998/35585A1 describes a toothbrush rack generally having three parts: back plate for affixing the rack to a wall, a holder for engaging a toothbrush head from the sides and a shell to provide an enclosure. The toothbrush is secured in the rack by three point retention between fingers of the holder and prevented from rotating by resting on the back plate. Unfortunately such racks are less sanitary than desired because the back plate which touches the toothbrush cannot be readily removed for cleaning. Also more modern toothbrush designs incorporating soft materials tend to get lodged in which requires disassembly of the rack for removal of the toothbrush.

U.S. Pat. No. 4,396,238 describes a two part enclosure. A box includes: a back plate for mounting to a wall, side panels and a bottom opening into which a toothbrush handle is inserted. A wedge shaped lid is hinged to the side walls such that its center of gravity causes the lid to rest on the box. Unfortunately, increased dexterity is required to feed the toothbrush handle through the bottom opening from the top. Not all toothbrush handles can be accommodated by a single bottom opening design. As above, the toothbrush rests against the box which is not readily removable from the wall for cleaning therefore resulting in a less than sanitary solution.

U.S. Pat. No. 5,332,107 describes a snap cap enclosure having a back, sides and top walls, a bottom slot and a hinged door. A toothbrush neck is engaged in the slot. While the entire snap cap enclosure is removable from a plate attached to the wall, the toothbrush head can freely touch the inside of the snap cap enclosure requiring very frequent cleaning thereof. Also repeated snap action tends to wear the parts out very fast making this proposal impractical.

U.S. Pat. No. 3,977,743 describes a similar enclosure as the snap cap above made from a single molded piece lodged in a wall bracket. The enclosure has a back part with a back wall and a slotted bottom wall, a cover part having top, front, side and partial bottom walls and hinge integral to the back and cover part. The slot is shaped to hold a toothbrush by its neck with the partial bottom wall impinging the toothbrush into the slot. While the enclosure can be made large enough for a toothbrush head to be prevented from touching the top, side, back and front walls, the toothbrush bristles rest on the partial bottom wall therefore requiring frequent cleaning. As well, the shaped slot limits compatibility with toothbrush shapes.

GB 1,061,092 and EP 90 10 3657 describe toothbrush enclosures configured to directly engage the resilient bristles of a toothbrush as a means to retain the toothbrush therein. Unfortunately, such enclosures require cleaning with every use.

SUMMARY

The above shortcomings in the prior art are addressed by employing a three-part toothbrush holder apparatus including as functional parts: a back plate, a resilient clamp and a front cover. The back plate and front cover form a housing, while the back plate, clamp and front cover provide a toothbrush enclosure. The clamp part has a general inverted "U" shape and is preferably made of a resilient material giving it a springy property. The clamp is shaped to urge two gripping arms towards one another in order for the overall clamp to act as retainer. Preferably two rollers at the tips of the gripping arms engage a toothbrush head inserted in the clamp as the clamp is spread apart from a clamped position to a deviated state. With the toothbrush inserted, the rollers exert pressure on the neck of the toothbrush to hold the toothbrush fast in place. The rolling engagement action of the rollers permits retention in the toothbrush enclosure of toothbrushes having heads fitted with rubber sides and enables a much more fluid motion of the toothbrush with respect to the toothbrush holder. Small tabs can be integrated into the clamp, which in combination with the back plate, limit the toothbrush to a single orientation as it is inserted into the enclosure.

In accordance with some embodiments of the proposed solution, there is provided a toothbrush holder for a toothbrush having a head portion, bristles extending from the head portion, a handle portion and a neck portion between the head portion and the handle portion, the holder comprising: a clamp having two opposing gripping members biased towards each other and having ends with opposed rollers to be separated by insertion of the head portion, wherein the head portion can slide over the rollers until said rollers can hold the neck portion; and a cover body adapted to protect the bristles when the toothbrush is held by the clamp.

In accordance with other embodiments of the proposed solution, there is provided a toothbrush holder for a toothbrush having a head portion, bristles extending from the head portion, a handle portion and a neck portion between the head portion and the handle portion, the holder comprising: a clamp having two opposing gripping members biased towards each other and having ends with opposed notches flared away from each other to be separated by insertion of the head portion and to guide the head portion to slide in the clamp until said notches hold the neck portion; and a cover body adapted to protect the bristles when the toothbrush is held by the clamp.

In accordance with further embodiments of the proposed solution, there is provided a toothbrush holder for a toothbrush having a head portion, bristles extending from the head portion, a handle portion and a neck portion between the head portion and the handle portion, the holder comprising: a clamp having two opposing gripping members biased towards each other and having ends with opposed notches flared away from each other to be separated by insertion of the head portion until the clamp can hold the neck portion; at least one tab extending from a portion of at least one of said ends of said gripping members to block insertion of the head portion by engaging said tab, wherein the head can be inserted into the clamp to a side of said tab; and a cover body adapted to protect the bristles when the toothbrush is held by the clamp.

In accordance with further embodiments of the proposed solution, there is provided a toothbrush holder for a toothbrush having a head portion, bristles extending from the head portion, a handle portion and a neck portion between the head portion and the handle portion, the holder comprising: a clamp having two opposing gripping members biased towards each other and including: opposed ends flared away from each other to be separated by insertion of the head portion until the clamp can hold the neck portion; and shoulders extending from a portion of said ends of said gripping members to block insertion of the head portion by engaging said shoulders until the head can be inserted into the clamp to a side of said shoulders; and a cover body adapted to protect the bristles when the toothbrush is held by the clamp.

In accordance with yet other embodiments of the proposed solution, there is provided a toothbrush holder for a toothbrush having a head portion, bristles extending from the head portion, a handle portion and a neck portion between the head portion and the handle portion, the holder comprising: a clamp having two opposing gripping members biased towards each other and having ends adapted to be separated by insertion of the head portion until the clamp can hold the neck portion; a cover body adapted to protect the bristles when the toothbrush is held by the clamp; and wherein the clamp provides sides for an enclosure while the cover body provides a front and back of said enclosure for the toothbrush head and bristles.

In accordance with an aspect of the proposed solution there is provided a toothbrush holder apparatus comprising: a back plate for affixing said toothbrush holder housing to a wall; a clamp configured to engage the back plate, and further configured to provide a gripping force between two opposing arms, each said arm having a corresponding tip, said clamp arms having rollers mounted substantially at the arm tips, said rollers being configured to rollingly engage a toothbrush having a head and a neck by sides of said toothbrush head and further configured to keep said toothbrush from slipping from the grip of said clamp against gravity, and a cover configured to mate with said back plate forming a substantially splash-proof housing, said housing having a bottom toothbrush insertion opening through which said toothbrush head is inserted and pulled out against said gripping force of said clamp.

In accordance with another aspect of the proposed solution there is provided a toothbrush clamp for preventing toothbrush head contamination, the clamp comprising: a clip configured to provide a gripping force between two opposing gripping members holding said toothbrush in the clip against the normal force of gravity, each gripping member having: a notch positioned and configured to slippingly engage the toothbrush head by a side thereof, both notches forming a channel-like guide for at least one of said toothbrush head and a toothbrush neck to be gripped in the clamp; and a tab extending substantially perpendicular to said channel-like guide such that both tabs form a slit therebetween, said tabs having corresponding tab faces configured to prevent insertion of said toothbrush head in the clamp between said tab faces.

In accordance with a further aspect of the proposed solution there is provided a toothbrush clamp for preventing toothbrush head contamination, the clamp comprising: a clip configured to provide a gripping force between two opposing gripping members, holding said toothbrush in the clip against the normal force of gravity, each gripping member having: a roller positioned and configured to rollingly engage the toothbrush head by a side thereof, both rollers forming a channel-like guide for at least one of said toothbrush head and a toothbrush neck to be gripped in the clip; and a tab extending substantially perpendicular to said channel-like guide such that both tabs form a slit therebetween, said tabs having corresponding tab faces configured to prevent insertion of said toothbrush head in the clamp between said tab faces.

In accordance with a further aspect of the proposed solution there is provided a toothbrush clamp for preventing toothbrush head contamination, the clamp comprising: a clip configured to provide a gripping force between two opposing gripping members, holding said toothbrush in the clip against the normal force of gravity, each gripping member having: a distal tip positioned and configured to slippingly engage the toothbrush head by a side thereof, both tips forming a restricted passage for at least one of the toothbrush head and a toothbrush neck to be gripped therebetween; and shoulders extending substantially parallel forming a slit therebetween, said shoulders being configured to prevent insertion of said toothbrush head in the clip between said shoulders.

In accordance with a further aspect of the proposed solution there is provided a toothbrush holder, the holder comprising: a back plate configured to be fixedly affixed to a substantially vertical surface; and a clip configured for attachment to said back plate, said clip providing a gripping force between at least two gripping members holding the toothbrush in the clip against the normal force of gravity, said clip gripping members forming a restriction element configured to releasably engage a toothbrush head by a side thereof, said restriction element being configured to grip therein at least one of the toothbrush head and a toothbrush neck, and said clip having a toothbrush orientation guide configured to limit said toothbrush to a preselected orientation.

In accordance with a further aspect of the proposed solution there is provided a toothbrush holder enclosure, the enclosure comprising: a back plate configured to be fixedly affixed to a substantially vertical surface; a clip configured for attachment to said back plate, said clip providing a gripping force between at least two gripping members holding the toothbrush in the clip against the normal force of gravity, said clip gripping members forming a restriction element configured to releasably engage a toothbrush head by a side thereof, said restriction element being configured to grip therein at least one of the toothbrush head and a toothbrush neck, and said clip having a toothbrush orientation guide configured to limit said toothbrush to a preselected orientation; and a cover configured to mate with said back plate forming a splash proof enclosure at least for said toothbrush head, said enclosure having a bottom opening through which said toothbrush is inserted and pulled out against said gripping force of said clip.

In accordance with yet another aspect of the proposed solution there is provided a toothbrush holder clip including grip members having double rollers for gripping a toothbrush therebetween in a selected one of two orientations.

Without limiting the invention, the above mentioned engagement features for retaining a toothbrush in a toothbrush holder apparatus, in accordance with some embodiments of the proposed solution, provide synergistic advantages derived for example from an improved retention between a toothbrush holder clip having rollers and a toothbrush having rubberized toothbrush head sides.

BRIEF DESCRIPTION OF THE DRAWINGS

The invention will be better understood by way of the following detailed description of embodiments of the invention with reference to the appended drawings, in which:

FIG. 1A is a schematic diagram illustrating a top view of a toothbrush holder enclosure in accordance with a first embodiment of the proposed solution;

FIG. 1B is a schematic diagram illustrating a front view of a toothbrush holder enclosure in accordance with the first embodiment of the proposed solution;

FIG. 1C is a schematic diagram illustrating a right side view of a toothbrush holder enclosure in accordance with the first embodiment of the proposed solution;

FIG. 1D is a schematic diagram illustrating a perspective view of a toothbrush holder enclosure in accordance with the first embodiment of the proposed solution;

FIG. 2A is a schematic diagram illustrating a top view of a back plate in accordance with a first implementation of the first embodiment of the toothbrush holder enclosure of the proposed solution;

FIG. 2B is a schematic diagram illustrating a front view of the back plate in accordance with the first implementation of the first embodiment of the toothbrush holder enclosure of the proposed solution;

FIG. 2C is a schematic diagram illustrating a right side view of the back plate in accordance with the first implementation of the first embodiment of the toothbrush holder enclosure of the proposed solution;

FIG. 2D is a schematic diagram illustrating a back view of the back plate in accordance with the first implementation of the first embodiment of the toothbrush holder enclosure of the proposed solution;

FIG. 2E is a schematic diagram illustrating a perspective view of the back plate in accordance with the first implementation of the first embodiment of the toothbrush holder enclosure of the proposed solution;

FIG. 3A is a schematic diagram illustrating a front view of another back plate in accordance with a second implementation of the first embodiment of the toothbrush holder enclosure of the proposed solution;

FIG. 3B is a schematic diagram illustrating a bottom view of the back plate in accordance with the second implementation of the first embodiment of the toothbrush holder enclosure of the proposed solution;

FIG. 3C is a schematic diagram illustrating a bottom perspective view of the back plate in accordance with the second implementation of the first embodiment of the toothbrush holder enclosure of the proposed solution;

FIG. 3D is a schematic diagram illustrating a top perspective view of the back plate in accordance with the second implementation of the first embodiment of the toothbrush holder enclosure of the proposed solution;

FIG. 4A is a schematic diagram illustrating a front view of a back plate and toothbrush grip element combination in accordance with the second implementation of the first embodiment of the toothbrush holder of the proposed solution;

FIG. 4B is a schematic diagram illustrating a bottom view of the back plate and toothbrush grip element combination in accordance with the second implementation of the first embodiment of the toothbrush holder of the proposed solution;

FIG. 4C is a schematic diagram illustrating a right side view of the back plate and toothbrush grip element combination in accordance with the second implementation of the first embodiment of the toothbrush holder of the proposed solution;

FIG. 4D is a schematic diagram illustrating a bottom perspective view of the back plate and toothbrush grip element combination in accordance with the second implementation of the first embodiment of the toothbrush holder of the proposed solution;

FIG. 4E is a schematic diagram illustrating a top perspective view of the back plate and toothbrush grip element combination in accordance with the second implementation of the first embodiment of the toothbrush holder of the proposed solution;

FIG. 5A is a schematic diagram illustrating a top view of a toothbrush grip element in accordance with a first implementation of the proposed solution;

FIG. 5B is a schematic diagram illustrating a front view of the toothbrush grip element in accordance with the first implementation of the proposed solution;

FIG. 5C is a schematic diagram illustrating a bottom view of the toothbrush grip element in accordance with the first implementation of the proposed solution;

FIG. 5D is a schematic diagram illustrating a right side view of the toothbrush grip element in accordance with the first implementation of the proposed solution;

FIG. 5E is a schematic diagram illustrating a back view of the toothbrush grip element in accordance with the first implementation of the proposed solution;

FIG. 5F is a schematic diagram illustrating a bottom perspective view of the toothbrush grip element in accordance with the first implementation of the proposed solution;

FIG. 5G is a schematic diagram illustrating a top perspective view of the clip toothbrush grip element in accordance with the first implementation of the proposed solution;

FIG. 6A is a schematic diagram illustrating a top view of a toothbrush grip element in accordance with a second implementation of the proposed solution;

FIG. 6B is a schematic diagram illustrating a front view of the toothbrush grip element in accordance with the second implementation of the proposed solution;

FIG. 6C is a schematic diagram illustrating a bottom view of the toothbrush grip element in accordance with the second implementation of the proposed solution;

FIG. 6D is a schematic diagram illustrating a right side view of the toothbrush grip element in accordance with the second implementation of the proposed solution;

FIG. 6E is a schematic diagram illustrating a top perspective view of the toothbrush grip element in accordance with the second implementation of the proposed solution;

FIG. 6F is a schematic diagram illustrating a bottom perspective view of the toothbrush grip element in accordance with the second implementation of the proposed solution;

FIG. 6G is a schematic diagram illustrating a another bottom perspective view of the toothbrush grip element in accordance with the second implementation of the proposed solution;

FIG. 7A is a schematic diagram illustrating a front view of a clip toothbrush grip element in accordance with a third implementation of the proposed solution;

FIG. 7B is a schematic diagram illustrating a right side view of the clip toothbrush grip element in accordance with the third implementation of the proposed solution;

FIG. 7C is a schematic diagram illustrating a bottom perspective view of the clip toothbrush grip element in accordance with the third implementation of the proposed solution;

FIG. 7D is a schematic diagram illustrating a top perspective view of the clip toothbrush grip element in accordance with the third implementation of the proposed solution;

FIG. 8A is a schematic diagram illustrating a top view of a front cover in accordance with the first embodiment of the toothbrush holder enclosure of the proposed solution;

FIG. 8B is a schematic diagram illustrating a front view of the front cover in accordance with the first embodiment of the toothbrush holder enclosure of the proposed solution;

FIG. 8C is a schematic diagram illustrating a right side view of the front cover in accordance with the first embodiment of the toothbrush holder enclosure of the proposed solution;

FIG. 8D is a schematic diagram illustrating a back view of the front cover in accordance with the first embodiment of the toothbrush holder enclosure of the proposed solution;

FIG. 10A is a schematic diagram illustrating a front view of another back plate in accordance with a fourth implementation of the first embodiment of the toothbrush holder enclosure of the proposed solution;

FIG. 10B is a schematic diagram illustrating a back view of the back plate in accordance with the fourth implementation of the first embodiment of the toothbrush holder enclosure of the proposed solution;

FIG. 10C is a schematic diagram illustrating a top view of the back plate in accordance with the fourth implementation of the first embodiment of the toothbrush holder enclosure of the proposed solution;

FIG. 10D is a schematic diagram illustrating a bottom view of the back plate in accordance with the fourth implementation of the first embodiment of the toothbrush holder enclosure of the proposed solution;

FIG. 10E is a schematic diagram illustrating a right side view of the back plate in accordance with the fourth implementation of the first embodiment of the toothbrush holder enclosure of the proposed solution;

FIG. 11A is a schematic diagram illustrating a front view of a toothbrush grip element in accordance with the fourth implementation of the first embodiment of the proposed solution;

FIG. 11B is a schematic diagram illustrating a back view of the toothbrush grip element in accordance with the fourth implementation of the first embodiment of the proposed solution;

FIG. 11C is a schematic diagram illustrating a top view of the toothbrush grip element in accordance with the fourth implementation of the first embodiment of the proposed solution;

FIG. 11D is a schematic diagram illustrating a bottom view of the toothbrush grip element in accordance with the fourth implementation of the first embodiment of the proposed solution;

FIG. 11E is a schematic diagram illustrating a right side view of the toothbrush grip element in accordance with the fourth implementation of the first embodiment of the proposed solution;

FIG. 12A is a schematic diagram illustrating a front view of a back plate and toothbrush grip element combination in accordance with the fourth implementation of the first embodiment of the toothbrush holder of the proposed solution;

FIG. 12B is a schematic diagram illustrating a bottom view of the back plate and toothbrush grip element combination in accordance with the fourth implementation of the first embodiment of the toothbrush holder of the proposed solution;

FIG. 12C is a schematic diagram illustrating a right side view of the back plate and toothbrush grip element combination in accordance with the fourth implementation of the first embodiment of the toothbrush holder of the proposed solution;

FIG. 12D is a schematic diagram illustrating a top perspective view of the back plate and toothbrush grip element combination in accordance with the fourth implementation of the first embodiment of the toothbrush holder of the proposed solution;

FIG. 12E is a schematic diagram illustrating a bottom perspective view of the back plate and toothbrush grip element combination in accordance with the fourth implementation of the first embodiment of the toothbrush holder of the proposed solution;

FIG. 13A is a schematic diagram illustrating a front view of a front cover in accordance with the fourth implementation of the first embodiment of the toothbrush holder enclosure of the proposed solution;

FIG. 13B is a schematic diagram illustrating a back view of the front cover in accordance with the fourth implementation of the first embodiment of the toothbrush holder enclosure of the proposed solution;

FIG. 13C is a schematic diagram illustrating a top view of the front cover in accordance with the fourth implementation of the first embodiment of the toothbrush holder enclosure of the proposed solution;

FIG. 13D is a schematic diagram illustrating a right side view of the front cover in accordance with the fourth implementation of the first embodiment of the toothbrush holder enclosure of the proposed solution;

FIG. 14A is a schematic diagram illustrating a front view of a front cover window in accordance with the fourth implementation of the first embodiment of the toothbrush holder enclosure of the proposed solution;

FIG. 14B is a schematic diagram illustrating a back view of the front cover window in accordance with the fourth implementation of the first embodiment of the toothbrush holder enclosure of the proposed solution;

FIG. 14C is a schematic diagram illustrating a top view of the front cover window in accordance with the fourth implementation of the first embodiment of the toothbrush holder enclosure of the proposed solution;

FIG. 14D is a schematic diagram illustrating a right side view of the front cover window in accordance with the fourth implementation of the first embodiment of the toothbrush holder enclosure of the proposed solution;

FIG. 14E is a schematic diagram illustrating a bottom perspective view of the front cover window in accordance with the fourth implementation of the first embodiment of the toothbrush holder enclosure of the proposed solution; and FIG. 14F is a schematic diagram illustrating a top perspective view of the front cover window in accordance with the fourth implementation of the first embodiment of the toothbrush holder enclosure of the proposed solution FIG. 15A is a schematic diagram illustrating a front view of another toothbrush holder enclosure in accordance with a second embodiment of the toothbrush holder of the proposed solution;

FIG. 15B is a schematic diagram illustrating a right side view of the toothbrush holder enclosure in accordance with the second embodiment of the toothbrush holder of the proposed solution;

FIG. 16A is a schematic diagram illustrating a top view of a clip toothbrush grip element in accordance with a third embodiment of a toothbrush holder of the proposed solution;

FIG. 16B is a schematic diagram illustrating a front view of the clip toothbrush grip element in accordance with the third embodiment of the toothbrush holder of the proposed solution;

FIG. 16C is a schematic diagram illustrating a bottom view of the clip toothbrush grip element in accordance with the third embodiment of the toothbrush holder of the proposed solution;

FIG. 16D is a schematic diagram illustrating a right side view of the clip toothbrush grip element in accordance with the third embodiment of the toothbrush holder of the proposed solution;

FIG. 16E is a schematic diagram illustrating a bottom perspective view of the clip toothbrush grip element in accordance with the third embodiment of the toothbrush holder of the proposed solution; and FIG. 16F is a schematic diagram illustrating a another bottom perspective view of the clip toothbrush grip element in accordance with the third embodiment of the toothbrush holder of the proposed solution, wherein similar features bear similar labels throughout the drawings. References to position qualifiers such as, but not limited to "top" and "bottom", in the present specification is made solely with reference to the orientation of the drawings as presented in the application and do not imply any absolute spatial orientation.

DETAILED DESCRIPTION

Toothbrush Holder

Figure 9E:
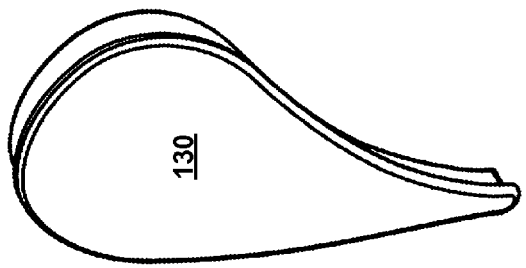
FIG. 9E is a schematic diagram illustrating a perspective view of the front cover window in accordance with the first embodiment of the toothbrush holder enclosure of the proposed solution.
Figure 9D:
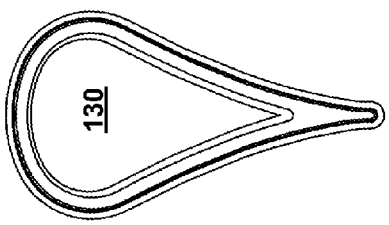
FIG. 9D is a schematic diagram illustrating a back view of the front cover window in accordance with the first embodiment of the toothbrush holder enclosure of the proposed solution.
Figure 9C:
FIG. 9C is a schematic diagram illustrating a left side view of the front cover window in accordance with the first embodiment of the toothbrush holder enclosure of the proposed solution.
Figure 9A:
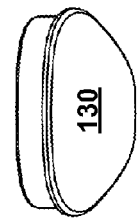
FIG. 9A is a schematic diagram illustrating a top view of a front cover window in accordance with the first embodiment of the toothbrush holder enclosure of the proposed solution.
Figure 9B:
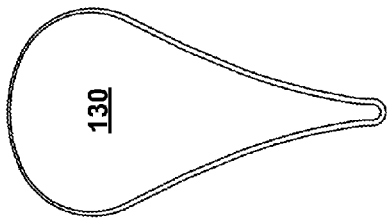
FIG. 9B is a schematic diagram illustrating a front view of the front cover window in accordance with the first embodiment of the toothbrush holder enclosure of the proposed solution.

FIGS. 1A, 1B, 1C and 1D illustrate a toothbrush holder 100 in accordance with a first embodiment of the proposed solution. In FIG. 1D, there is also shown a toothbrush 10 having a head portion 12, bristles 14 extending from the head portion 12, a handle portion 16 and a neck portion 18 between the head portion 12 and the handle portion 16.

In accordance with the first embodiment of the proposed solution, the toothbrush holder 100 generally includes a toothbrush holder enclosure 110, or housing, and a toothbrush clamping member 200. The housing 110 is configured to protect a toothbrush inserted in the toothbrush holder; preferably the housing 110 is a splash-proof enclosure. An opening 102 is provided at the bottom of the enclosure 110 for passing a toothbrush therethrough.

In accordance with a first implementation, the toothbrush holder enclosure 110 includes a front cover 112 and a back plate 114. FIG. 1B illustrates the front cover 112 of the enclosure 110, while FIGS. 1A, 1C and 1D illustrate both the front cover 112 and back plate 114, in a configuration in which the front cover 112 is mated to the back plate 114. For example, with reference to FIGS. 3A, 3B, 3C and 3D the front cover 112 and the back plate 114 can be configured to snap-fit together. However the front cover 112 and the back plate 114 can be glued together. Preferably, the front cover 112 is removable, for example in order to be cleaned in a dishwasher or any other appropriate means of sanitation compatible with the material from which the front cover 112 is manufactured. Without limiting the invention, as illustrated in FIGS. 1A and 1D the front cover 112 is further configured to expose the back plate 114 as little as possible, for example to prevent splashing. The bottom of the front cover 112 forms part in defining the enclosure opening 102. Without limiting the invention, FIG. 1C illustrates the front cover 112 and back plate 114 mating at an angle 116 to the vertical; in this first embodiment the back plate 114 having a general wedge shape. Further description of other details of the front cover 112 of this first embodiment are presented hereinbelow with reference to FIGS. 8A, 8B, 8C, 8D, 9A, 9B, 9C, 9D, and 9E. For clarity, the invention is not limited to a symmetric toothbrush holder enclosure 110; symmetric toothbrush holder enclosure 110 implementations are only illustrated for ease of description herein.

Returning to the back plate 114, FIGS. 2A, 2B, 2C, 2D, and 2E illustrate a back plate 114 in accordance with a first implementation the first embodiment of the proposed solution. The back plate 114 has a generally flat shape, including a flat middle portion 118. The back plate 114 is configured to be affixed to a substantially vertical wall, preferably semi-permanently for example on tile with an adhesive or permanently (with reference to FIGS. 10A, 10B, 10F and 10G) on wood with fasteners (not shown) such as screws and the like. A disposable toothbrush holder 100 can employ a suction cup fastener. Without limiting the invention, FIG. 2D illustrates an oblong central region in the flat middle portion 118 where an adhesive or two sided tape can be applied.

The back plate 114 of this implementation of the first embodiment has a peripheral edge 121 partially employed in providing the snap-fit with the front cover 112, wherein the front cover 112 has snap tabs configured to extend around and about the obround peripheral edge part of the back cover reducing back plate 114 exposure even further (not illustrated) than illustrated in FIGS. 1A, 1C and 1D. For disposable implementations of the proposed solution, the front cover 112 can be glued to the back plate 114 around the obround peripheral rim 121 of the back plate 114. The bottom of the peripheral edge 121 of the back plate 114 forms part in defining the enclosure opening 102. The invention is not limited to a discontinuous peripheral edge 121, FIGS. 3A, 3C and 3D illustrate a wholly ovaloid peripheral edge 121.

The back plate 114 is further configured to engage a toothbrush grip element 200 of the toothbrush holder 100. In accordance with the first implementation of the first embodiment of the proposed solution, a pair of substantially horizontal support (bottom) tabs 260 extending forward with respect to the toothbrush holder enclosure 110 as illustrated and away from the back plate 114 is provided for the toothbrush grip element 200 to rest thereon. The invention is not limited to a pair of support tabs 260 or to horizontal support tabs 260. For certainty, the pair of symmetric support tabs 260 is illustrated only for ease of description, a single tab 260 can be sufficient as will be described hereinbelow with reference to the toothbrush grip element 200. Preferably the back plate 114 has a wedge shape (166) when viewed from the side as illustrated in FIG. 2C which orients the peripheral edge 121 of the back plate 114 at an angle 116 to the middle portion 118 of the back plate 114, and by extension at an angle 116 to the wall to which the back plate 114 is affixed. As such, the support tabs 260 can be substantially perpendicular to the wall, or substantially perpendicular to a plane of the peripheral mating edge 121 of the back plate 114. For certainty the peripheral mating edge 121 of the back plate 114 need not lie in a plane, and the support tabs 260 can be angled towards the wall.

In accordance with a second implementation of the first embodiment of the proposed solution, FIGS. 3A, 3B, 3C and 3D illustrate a back plate 114 including snap tabs 270 for engaging a front cover 112 in snap-fit and a different configuration for engaging a toothbrush grip element 200.

In accordance with the second implementation of the first embodiment, the snap-fit between the front cover 112 and the back plate 114 is provided by a short wall 272 extending forward from the back plate 114, not necessarily continuously, generally around the peripheral edge 121 of the back plate 114. The wall 272 in this second implementation enables improved snap-fit mating and can be manufactured out of a resilient material, for example a suitable polymer. The wall 272 can be discontinuous with notches 274 (For example illustrated in FIGS. 10E, 10F and 10G) between non-bending portions 272 of the wall 272 and bending snap tabs 270 provided in the short wall 272. The snap-tabs 270 can include hook elements for engaging the front cover 112.

It is noted that the toothbrush is inserted in the enclosure opening 102 while the toothbrush is held in by the grip element 200—some form of alignment between the enclosure opening 102 and the grip element 200 can be beneficial though not necessarily required in every embodiment. In accordance with the second implementation of the first embodiment, support and alignment (260) is provided for the toothbrush grip element 200. A pair of support tabs 260 is provided, however it is noted that the support tabs 260 are illustrated in FIGS. 10A and 12A angled towards each other. Without limiting the invention, the angle between the support tabs 260 can provide a way for the grip element 200 to return to a grip configuration, enhance the grip on the toothbrush, align the grip element 200 or any combination of thereof.

Another pair of top support tabs 280 is illustrated substantially at the apex of the back plate 114 and configured to provide further support for the grip element 200 and alignment. Without limiting the invention, alignment can be provided by the top tabs 280 being slanted away from each other and/or by a slit 282 therebetween for an appropriately configured grip element 200 extending into the slit 282, for example a spine 284 on the grip element 200 extending into the slit 282.

While not required, left and right snap-tabs 270 extend out beyond the short wall 272 and are illustrated positioned about the bottom support tabs 260, for example enhancing the strength of the bottom support tabs 260 and/or providing further side alignment for the toothbrush grip element 200.

Another optional crown tab 290 is illustrated which enables the use of the back plate 114 and toothbrush grip 200 combination without the front enclosure 112. The crown tab 290, either by itself or in combination with the front cover 112 provides an opposing force while the toothbrush is inserted into the toothbrush holder 100. The crown tab 290 can also counter the material deflection also employed in configuring the snap-tabs 270. When the crown tab 290 is not present the front cover 112 or the short wall 272 provides the opposing force while the toothbrush is inserted into the toothbrush holder 100. For certainty the crown tab 290 need not be crown shaped.

In accordance with the second implementation of the first embodiment of the proposed solution, FIGS. 4A, 4B, 4C, 4D, and 4E illustrate a back plate 114 and toothbrush grip element 200 combination. The grip element 200 cooperates with the back plate 114 via the bottom support tabs 260, the top support tabs 280 and optionally the crown tab 290. A pair of grip element tabs 210 rest on the bottom support tabs 260 of the back plate 114. The illustrated grip element 200 includes a guide 284 cooperating with the slit 282 between the top support tabs 280, without limiting the invention thereto. As illustrated, the back plate 114 and toothbrush grip element 200 combination can cooperate to enable the retention of a toothbrush without the front cover 112.

Preferably the toothbrush grip element 200 is configured to mechanically engage the toothbrush by clamping thereof. In accordance with one way of using the combination, the top support tabs 280 and crown tab 290 securely engage the grip element 200, for example via snap-hooks or another separable engagement, and the toothbrush is inserted in the grip element 200 against the crown tab 290 (and/or the wall 272 if present) and extracted from the grip element 200 against the support tabs 280/260. In accordance with another way of using the combination, the top support tabs 280 operate as a hook on which the grip element 200 is hung, the grip element 200 being removed from the back plate 114 during insertion and extraction of the toothbrush therefrom and replaced thereafter. References to a "cover body" herein are intended to include the toothbrush holder enclosure 110 as a whole.

For certainty the toothbrush grip element 200 engages the toothbrush, at least the toothbrush head, and is preferably removable from the enclosure for sanitation. For certainty, the invention is not limited to employing a removable toothbrush grip element 200, in a disposable toothbrush holder 100 the toothbrush grip element 200 may not be removable. Disposable toothbrush holders 100 may be used in the hotel industry or in a hospital setting.

FIG. 4C best illustrates the angled portion (116) of the back plate 114, in combination with the grip element 200, the angled portion (116) of the back plate 114 can serve to urge the grip element 200 toward the wall when a front cover 112 is not employed and/or account for toothbrushes having handles curved towards to wall when inserted to prevent the toothbrush handle from urging the toothbrush grip element 200 (and the toothbrush holder 100 as a whole) away from the wall.

Used with a front cover 112, the combination of the back plate 114 and grip element 200 is configured to substantially align the travel path of the toothbrush with the enclosure opening 102. FIG. 4B best illustrates ends 204 of the grip element 200 aligned with the bottom peripheral edge 121 of the back plate 114.

Clip

FIGS. 5A, 5B, 5C, 5D, 5E, 5F and 5G illustrate a first implementation of the toothbrush grip element 200 in accordance with the first embodiment of the proposed solution.

The toothbrush grip element 200 includes a clip (200) and optionally alignment elements 210/284 for example as described above. For certainty, the spine 284 is present only in some implementations. As described hereinabove, the presence of the spine 284 does not imply use as the top support tabs 280 are optional. For the reminder of the description references to a "clip" include the toothbrush grip element 200.

The clip 200 includes two opposing grip members 202, biased towards each other, cooperating to engage at least the tooth brush head. The clip 200 is configured to grip at least one of the toothbrush head and a toothbrush neck to hold the toothbrush in the toothbrush holder 100. The grip members 202 can be biased against each other being manufactured from a resilient material, for example an elastic material not limited to polymers. A metal clip 200 could also provide the necessary resilient grip. Form a manufacturing perspective, polymers can be injection molded into the form of the clip 200. The invention is not limited to a manufacturing technique.

In some embodiments the toothbrush is held in the toothbrush holder against the normal force of gravity.

The grip members 202 are separated by the insertion, and conversely by the extraction, of the head portion of the toothbrush.

Preferably the engagement area between the toothbrush as a whole and the toothbrush holder 100 as a whole is minimized. Preferably engagement is reduced to grip members' 202 ends 204.

With reference to the first clip implementation, chiefly illustrated in FIGS. 4A, 4B, 4C, 4D, 4E, 5A, 5B, 5C, 5D, 5E, 5F and 5G, grip member ends 204 employ rollers 206. Each roller 206 is configured to journal around a corresponding pivot providing rolling mechanical engagement between the clip 200 and the toothbrush. The head portion of the toothbrush can slide over the rollers 206 until the toothbrush snaps into grip. In some implementations the toothbrush snaps into grip when the rollers 206 engage the neck portion of the toothbrush.

For certainty, the invention is not limited to both grip members 202 being resilient. A single resilient grip member 202 impinging against a stiff grip member (202) would work.

Preferably the rollers 206 form a channel-like guide 208 for the toothbrush head and/or neck. For example the rollers 206 can include a circumferential notch 212 defining the channel-like guide 208 therebetween.

The circumferential notches 212 (either singly or in combination) present a concave depression at the bottom of the toothbrush holder 100 to the toothbrush head leading into the channel-like guide 208 between the gripping members 202.

Preferably the clip 200 includes a pair of clip tabs 210 extending from said ends 204 generally away from the clip ends 204 in a desired orientation of the bristles of the toothbrush. FIGS. 4A, 4B, 4C, 4D, 4E, 5A, 5B, 5C, 5D, 5E, 5F, 5G (and 6A, 6B, 6C, 6D, 6E, 6F, 6G) illustrate clip tabs 210 extending towards the back of the toothbrush holder 100 for inserting a toothbrush in with the bristles towards the wall. The clip tabs 210 form a slit 214 between them. The slit 214 allows the bristles to pass between the tabs 210.

In accordance with the proposed solution, the clip tabs 210 are configured to prevent the toothbrush head from being inserted into the clip 200 while the toothbrush head can be inserted between the clip rollers 206 forcing a particular orientation of the toothbrush. While FIGS. 4A, 4B, 4C, 4D, 4E, 5A, 5B, 5C, 5D, 5E, 5F, 5G (and 6A, 6B, 6C, 6D, 6E, 6F, 6G) illustrate clip tabs 210 generally perpendicular to the direction of travel of the toothbrush head into the clip 200, the invention is not limited to blocking toothbrush travel. Alternatively, the clip tabs 210 can be configured to present a convex overall surface to the incoming toothbrush head deflecting the toothbrush head away. As well the clip tabs 210 can be in the same plane angled away or askew (FIGS. 11A, 11B, 11E and 11F) with respect to the direction of travel of the toothbrush head to provide deflection.

For certainty, the invention is not limited to the use of two rollers 206. More than two rollers 206 can be employed (not shown) which need not engage the neck of the toothbrush. A single roller 206 impinging against the other grip member 202 would also work. Employing rollers 206 enables use of toothbrushes with rubberized head sides.

FIGS. 6A, 6B, 6C, 6D, 6E, 6F and 6G illustrate a second implementation of the toothbrush grip element 200 in accordance with the first embodiment of the proposed solution. For brevity description of structures and elements similar to the first toothbrush grip element 200 implementation is not repeated. The second clip 200 implementation does not employ rollers (206) per se, instead grip member ends 204 include opposing notches 212 defining the channel-like guide 208 between them. The notches 212 are configured to engage at least the toothbrush head via sliding mechanical engagement. The notches 212 are further flared away from each other presenting to an incoming toothbrush head a concave depression leading into the channel-like guide 208. Similar variations can be employed as with rollers 206, variations in the number of notches 212 and material resilience of the grip members 202.

Best illustrated in FIGS. 5F, 5C, 5D, 6C, 6D and 6G are tab 210 tips which extend beyond the toothbrush bristles, in combination with the notches 212, to space the bristles away from the back plate 114.

The invention is not limited to spacing the bristles away from the back plate 114 via tab 210 tips. FIGS. 4A, 4B, 4C, 4D, 4E, 5A, 5B, 5C, 5D, 5E, 5F, 5G, 6A, 6B, 6C, 6D, 6E, 6F and 6G illustrate a clip 200 body deflected and extending towards the back plate 114 in the direction of the bristles to space the bristles away from the back plate 114.

For certainty the invention is not limited to the use of clip tabs 210 to orient the toothbrush in the toothbrush holder 100. FIGS. 7A, 7B, 7C and 7D illustrate a third implementation of the toothbrush grip element 200 in accordance with the first embodiment of the proposed solution. For brevity description of structures and elements similar to the first toothbrush grip element 200 implementation is not repeated.

Toothbrush orientation is provided via a pair of shoulders 216. The grip members 202 are shaped to flare away at the ends 204 presenting the concave depression to the incoming toothbrush head while the shoulders 216 are configured to provide a restricted passage allowing only the bristles to pass therebetween. The shoulders 216 can be flared also but with a tighter radius or even present edges to the incoming toothbrush head while defining a slit (214) therebetween for the bristles to pass through and forcing a toothbrush orientation with respect to the clip 200. The shoulders 216 can include an edge extending substantially parallel to the grip members 202 defining the channel-like guide 208 and/or include another edge extending substantially perpendicular to the grip members 202 defining the slit 214. For spacing the bristles away from the back plate 114, shoulders 216 extend towards the back plate 114 more than the length of the bristles.

Notably in this implementation the spine alignment element 284 is replaced by two bumps 284 configured to engage corresponding openings (not shown) in the back plate 114. The back plate 114 would also not require bottom support tabs 260.

Front Cover

Returning to the description of the front cover 112, the front cover is not necessarily a single piece. FIGS. 8A, 8B, 8C and 8D illustrate a first front cover element 120 generally but not necessarily opaque configured to engage the back plate 114 via an adhesive. Preferably the cover 112, as illustrated in FIGS. 13B, 13D, 13E and 13F, engage the back plate 114 via a snap-fit engagement 270 as described herein above.

Preferably the front cover 112 includes flared sides 103 best illustrated in FIGS. 1B, 1C, 1D, 8B, 8C and 8D providing further guidance for the insertion of the toothbrush head into the toothbrush holder 100.

The front cover 112 can be provided with a window 130 into the toothbrush holder enclosure 110. FIGS. 9A, 9B, 9C, 9D and 9E illustrate a second front cover element 130, a window. For example the front cover window 130 can be tear drop shaped and can have features of shape and configuration adapted for snap-fit into the first front cover element 120.

Preferred Embodiment

In accordance with a fourth implementation of the first embodiment on the proposed solution FIGS. 10A, 10B, 10C, 10D, 10E, 10F and 10G illustrate a reusable sanitary back plate 114. Features in common with the back plate 114 illustrated in FIGS. 3A, 3B, 3C and 3D are not repeated.

The back plate 114 has an overall ovaloid shape with an interrupted peripheral wall 272. Via material choice, for example a polymer, and/or material thickness freely extending snap tabs 270 can be configured to provide more bending than the peripheral wall 272 in engaging the front cover 112. The peripheral wall 272 can be configured to provide improved rigidity in engaging the front cover 112, whereas the snap tabs 270 act to pull the front cover 112 shut towards the back plate 114.

Figure 10G:
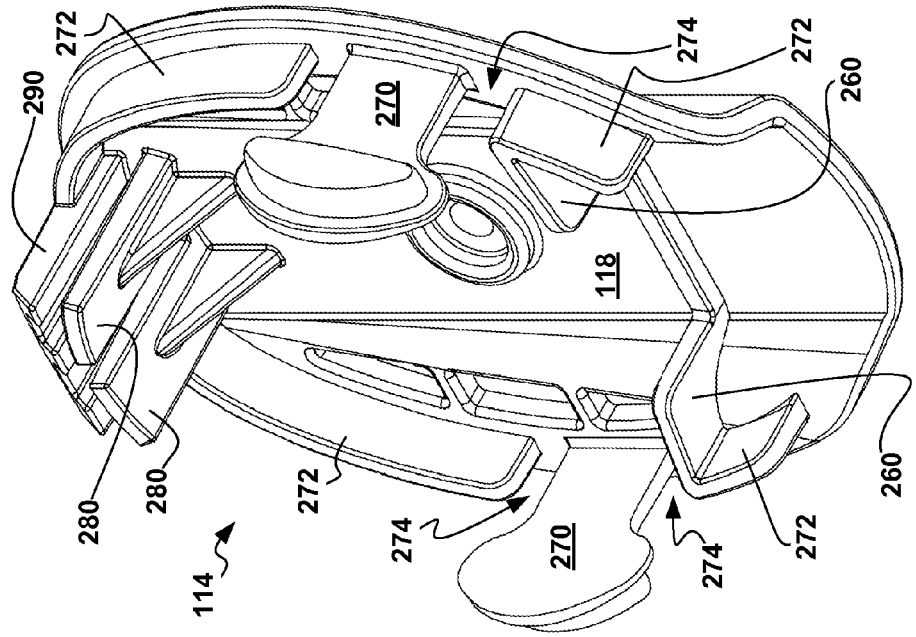
FIG. 10G is a schematic diagram illustrating a bottom perspective view of the back plate in accordance with the fourth implementation of the first embodiment of the toothbrush holder enclosure of the proposed solution.
Figure 10F:
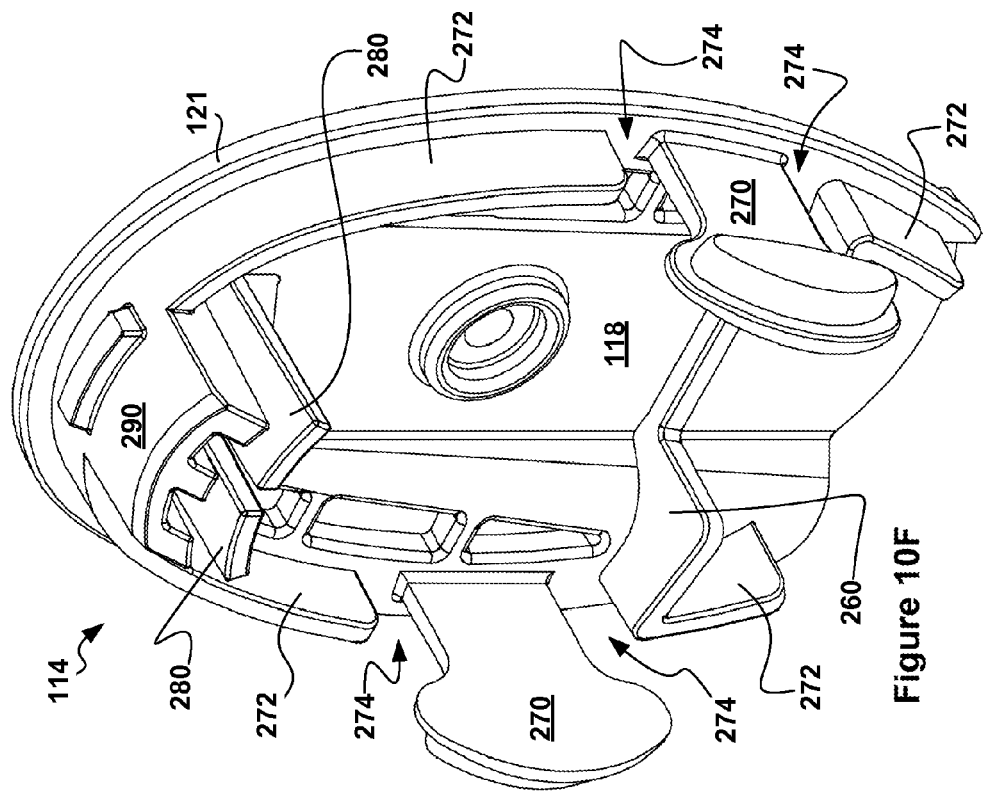
FIG. 10F is a schematic diagram illustrating top perspective view of the back plate in accordance with the fourth implementation of the first embodiment of the toothbrush holder enclosure of the proposed solution.

As illustrated in FIG. 10B an obround region 118 for affixing a double sided tape or an adhesive is provided on the back surface of the back plate 114, as well a reinforced opening is provided, as best illustrated in FIGS. 10A, 10B, 10F and 10G, for receiving and engaging a fastener or a suction cup (not shown) for secure engagement with a bathroom wall.

In accordance with the fourth implementation, the support tabs 270 are reinforced. The bottom support tabs 260 are integral with the peripheral wall 272 as best observable in FIGS. 10A, 10F and 10G. As best illustrated in FIGS. 10A, 10D and 10G the top support tabs 280 are reinforced via spines.

FIGS. 11A, 11B, 11C, 11D, 11E, 11F and 11G illustrate a reusable sanitary toothbrush grip element 200 or clamp 200. Features in common with the clamp 200 illustrated in FIGS. 5A, 5B, 5C, 5D, 5E, 5F and 5G are not repeated.

Figure 11G:
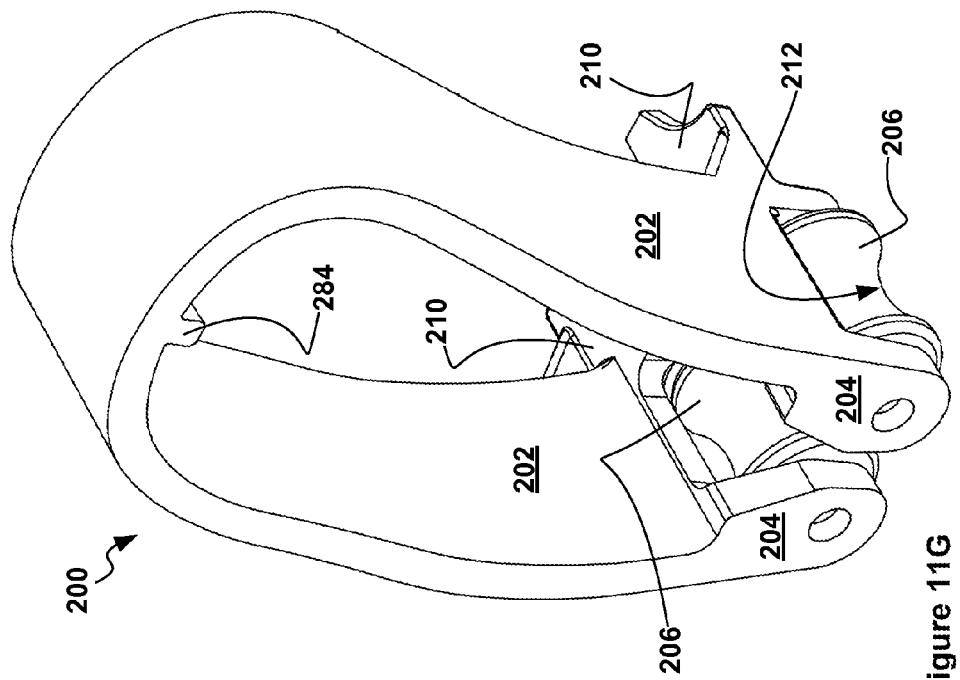
FIG. 11G is a schematic diagram illustrating a top perspective view of the clip toothbrush grip element in accordance with the fourth implementation of the first embodiment of the proposed solution.
Figure 11F:
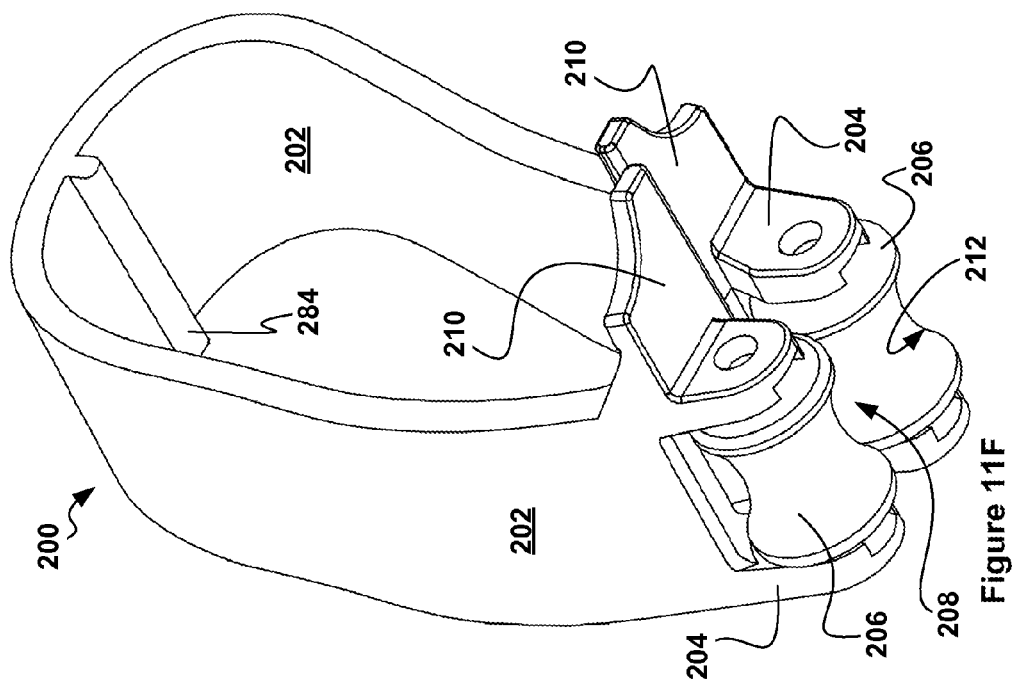
FIG. 11F is a schematic diagram illustrating a bottom perspective view of the toothbrush grip element in accordance with the fourth implementation of the first embodiment of the proposed solution.
Figure 13F:
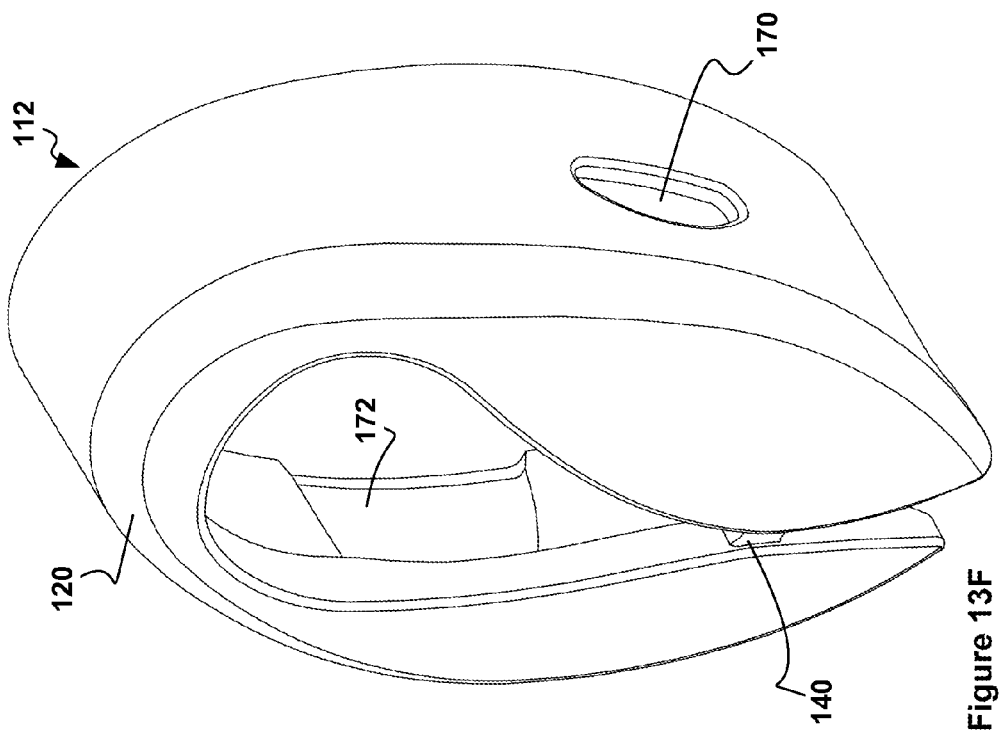
FIG. 13F is a schematic diagram illustrating a top perspective view of the front cover in accordance with the fourth implementation of the first embodiment of the toothbrush holder enclosure of the proposed solution.
Figure 13E:
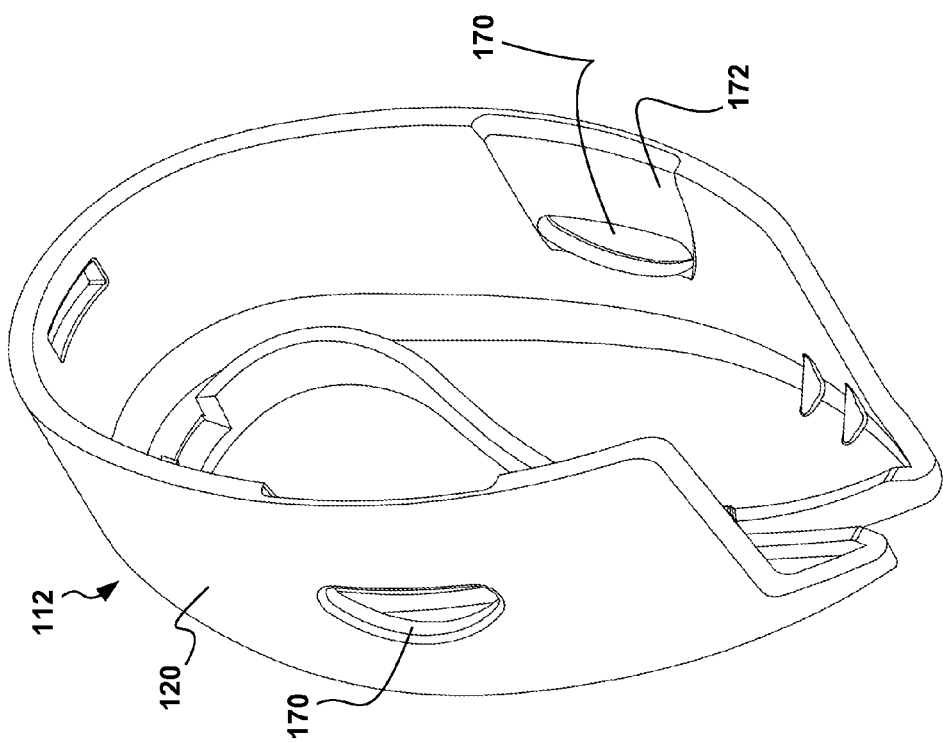
FIG. 13E is a schematic diagram illustrating a bottom perspective view of the front cover in accordance with the fourth implementation of the first embodiment of the toothbrush holder enclosure of the proposed solution.

The clamp 200 employs a pair of toothbrush grip element tabs 210 reinforced by corresponding spines best illustrated in FIGS. 11B, 11E and 11F. It is noted that the clamp tabs 210 are not in the same plane as illustrated in FIGS. 11A, 11B, 11E and 11F.

FIGS. 12A, 12B, 12C, 12D, and 12E illustrate an assembled reusable sanitary toothbrush grip element 200 and back plate 114 combination. Features in common with the combination illustrated in FIGS. 4A, 4B, 4C, 4D, and 4E are not repeated.

FIGS. 13A, 13B, 13C, 13D, 13E and 13F illustrate a reusable sanitary front cover 112/120. Features in common with the front cover 120 illustrated in FIGS. 8A, 8B, 8C and 8D are not repeated.

The front cover 120 lacks flared lateral walls (FIGS. 13A, 13B and 13E) while a reinforcing bridge 140 is provided between the two sides forming the window (130). The bridge 140 best illustrated in FIGS. 13A, 13B, 13C and 13F can also be configured to participate in securing the window 130 as will be described herein below. A number of reinforcing spines are visible in FIGS. 13B and 13E providing improved rigidity around the bottom opening of the housing 110. Snap fit openings 170 for mechanically engaging the snap fit tabs 270 of the back plate 114 are best illustrated in FIGS. 13B, 13D, 13E and 13F. The snap fit tabs 270 are guided by channels 172 best illustrated in FIGS. 13B, 13E and 13F.

FIGS. 14A, 14B, 14C, 14D, 14E and 14F illustrate a reusable sanitary front cover window 130. Features in common with the front cover window 130 illustrated in FIGS. 9A, 9B, 9C, 9D and 9E are not repeated.

Notably the window 130 employs a bottom hook 132 for engaging the bridge 140 and a top snap fit bump 134 for engaging to top of the front cover 120. Both hook 132 and bump 134 act to releasably retain the window 130 in snap fit engagement with the front cover 120.

Integral Toothbrush Holder

In accordance with a second embodiment of the proposed solution, an integral toothbrush holder enclosure 110 is illustrated in FIGS. 15A and 15B. The toothbrush holder 100 includes a generally flat back plate 114 configured to be affixed to a wall.

The front cover 120 can be integral with, mountable to, fixedly adhered to, etc. the back plate 114 generally having a "U" shaped cross-section. Opposing resilient grip members 202 of a clip 200 form the side walls of the toothbrush holder enclosure 110.

Preferably the grip members 202 have flared ends (103) 204 to guide the toothbrush into the toothbrush housing enclosure 110.

Preferably a suction cup fastener or a suitable removable fastener is provided, the toothbrush holder enclosure 110 being adapted for travel.

Double Rollers

In accordance with a third embodiment of the proposed solution, another toothbrush holder clip 200 is illustrated in FIGS. 16A, 16B, 16C, 16D, 16E and 16F. The toothbrush holder clip 200 includes double rollers 206 configured to permit a toothbrush to be inserted into the toothbrush holder clip 200, and therefore by extension in a toothbrush holder enclosure 110, in either of two orientations: with the bristles facing forward or with the bristles facing away. While clip tabs (210) such as shown in FIGS. 5C, 5D, 5E, 5F and 5G are not employed, the second pair of rollers 206 spaces the bristles, and therefore the toothbrush head, from coming in contact with structures, surfaces, objects, etc. external to the toothbrush holder clip 200 in either orientation. Opposing resilient grip members 202 of the clip 200 can form the side walls of a corresponding toothbrush holder enclosure 110. In some implementations the toothbrush enclosure 110 is configured to better cooperate with a toothbrush having a specific shape to reduce toothbrush positional play within the toothbrush holder clip 200. The illustrated toothbrush holder clip 200 is illustrated to have an "A" shape which can provide reduction in toothbrush positional play therein. Other details of an optional back plate (114) and an optional front cover (112), for example as mentioned hereinabove, are omitted for brevity.

While the invention has been shown and described with referenced to preferred embodiments thereof, it will be recognized by those skilled in the art that various changes in form and detail may be made therein without departing from the spirit and scope of the invention as defined by the appended claims.

What is claimed is:

1. A toothbrush holder for a toothbrush having a head portion, bristles extending from the head portion, a handle portion and a neck portion between the head portion and the handle portion, the holder comprising:
   a clip having two opposing gripping members biased towards each other and having ends with opposed rollers to be separated by insertion of the head portion, wherein the head portion can slide over the rollers until said rollers can hold the neck portion; and
   a cover body adapted to protect the bristles when the toothbrush is held by the clip;
   wherein each roller is configured to present a depression to said toothbrush head portion for guiding said toothbrush head portion between said grip members.

2. A toothbrush holder as claimed in claim 1, wherein each roller is configured to rollingly engage said toothbrush head portion by a side thereof, both rollers forming a channel guide for said toothbrush neck to be releaseably gripped in said clip.

3. A toothbrush holder as claimed in claim 1, each of said rollers having a circumferential notch, the pair of circumferential notches presenting said depression to said toothbrush head portion leading into a channel guide formed by said notches.

4. A toothbrush holder as claimed in claim 1, wherein at least one of said rollers is configured to journal about a corresponding pivot providing rolling engagement between said roller and said toothbrush.

5. A toothbrush holder as claimed in claim 1, wherein at least one of said gripping members includes a resilient material providing said gripping force against the corresponding opposing gripping member.

6. A toothbrush holder as claimed in claim 1, wherein at least one of said rollers includes a resilient material providing said gripping force against the corresponding opposing roller.

7. A toothbrush holder as claimed in claim 1, further comprising at least one tab extending from a portion of said ends of the gripping members to block insertion of the head portion by engaging said tab, wherein the head can be inserted into the clip to a side of said tab.

8. A toothbrush holder as claimed in claim 7, wherein a pair of tabs forms a slit therebetween, said tabs having corresponding tab faces configured to prevent insertion of said toothbrush head in the clip between said tab faces while allowing the bristles to pass therebetween limiting the toothbrush to a preselected orientation.

9. A toothbrush holder as claimed in claim 8, wherein said tab faces are substantially planar and at least one of:
   in the same plane with respect to one another;
   presenting a convex surface to the toothbrush head while being inserted in said holder; and
   presenting to said toothbrush head a surface slanted away or askew from said rollers while inserting said toothbrush head in the clip.

10. A toothbrush holder as claimed in claim 1, said clip having at least one edge extending in a direction of said toothbrush bristles.

11. A toothbrush holder as claimed in claim 10, said at least one edge extending in the direction of said bristles being an edge of at least one of said gripping members.

12. A toothbrush holder as claimed in claim 1, wherein the cover body comprises a back plate and a front cover, said back plate being configured to be fixedly affixed to a substantially vertical surface and said clip being configured to be removably hung on said back plate.

13. A toothbrush holder as claimed in claim 12, wherein said back plate is affixed to said wall with adhesive.

14. A toothbrush holder as claimed in claim 12, wherein said front cover is configured to mate with said back plate to form a splash proof enclosure at least for the toothbrush head, said enclosure having a bottom opening through which the toothbrush is inserted and pulled out against said gripping force of said clip.

15. A toothbrush holder as claimed in claim 1, wherein said depression forms a concave depression.

* * * * *